(12) United States Patent
Crook et al.

(10) Patent No.: US 6,786,226 B2
(45) Date of Patent: Sep. 7, 2004

(54) BATTERY FLUID SUPPLY SYSTEM

(75) Inventors: Randall L. Crook, Evans, GA (US); Daniel T. Aron, McCormick, SC (US); Michael A. Vassily, North Augusta, SC (US); James R. Kerlin, Martinez, GA (US); Gerald C. Skelton, Martinez, GA (US)

(73) Assignee: Club Car, Inc., Augusta, GA (US)

( * ) Notice: Subject to any disclaimer, the term of this patent is extended or adjusted under 35 U.S.C. 154(b) by 0 days.

(21) Appl. No.: 10/242,321

(22) Filed: Sep. 12, 2002

(65) Prior Publication Data

US 2003/0102029 A1 Jun. 5, 2003

Related U.S. Application Data

(63) Continuation-in-part of application No. 10/093,336, filed on Mar. 7, 2002, now Pat. No. 6,718,996, which is a continuation-in-part of application No. 09/829,766, filed on Apr. 10, 2001, now Pat. No. 6,622,744, which is a continuation-in-part of application No. 09/545,939, filed on Apr. 10, 2000, now Pat. No. 6,213,145.

(51) Int. Cl.[7] .................................................. H01M 2/36

(52) U.S. Cl. ........................... 137/1; 137/260; 137/899; 429/63; 429/74

(58) Field of Search ................................ 137/260, 899, 137/261, 1; 429/63, 74

(56) References Cited

U.S. PATENT DOCUMENTS

| | | | |
|---|---|---|---|
| 539,689 A | 5/1895 | Knispel |
| 932,087 A | 8/1909 | Apple |
| 1,165,100 A | 12/1915 | Holland |
| 1,275,261 A | 8/1918 | Hutchinson |
| 1,324,797 A | 12/1919 | Chubb |
| 1,765,433 A | 6/1930 | Lavett |
| 1,791,152 A | 2/1931 | Van Meter, Jr. |
| 1,869,258 A | 7/1932 | Holland |
| 1,878,223 A | 9/1932 | Woodbridge |
| 1,938,989 A | 12/1933 | Woodbridge |
| 1,942,908 A | 6/1934 | Swain |
| 2,135,158 A | 11/1938 | Wolford |
| 2,141,621 A | 12/1938 | Setzer |
| 2,220,005 A | 10/1940 | Smith |
| 2,393,967 A | 2/1946 | Brubaker |
| 2,532,520 A | 12/1950 | Simpson |
| 3,083,253 A | 3/1963 | Sundberg |
| 3,102,058 A | 8/1963 | Jones |
| 3,287,173 A | 11/1966 | Cox et al. |
| 3,372,716 A | 3/1968 | Hommel et al. |
| 3,483,042 A | 12/1969 | Hulse |
| 3,542,598 A | 11/1970 | White et al. |

(List continued on next page.)

FOREIGN PATENT DOCUMENTS

| | | |
|---|---|---|
| DE | 3018372 | 11/1981 |
| JP | 5860866 | 4/1983 |
| WO | WO 98/40653 | 9/1998 |

*Primary Examiner*—Kevin Lee
(74) *Attorney, Agent, or Firm*—Michael Best & Friedrich, LLP

(57) ABSTRACT

A system for supplying fluid to a battery, a vehicle and a method for supplying fluid to a battery. The fluid supply system supplies fluid to a battery in a vehicle selectively powered by the battery, the vehicle including a frame supporting the battery, the battery including a battery cell, fluid being transmittable to the cell, gas generated during charging of the battery being transmittable out of the cell. The system is defined as including a tank for holding fluid, and a hydraulic circuit connecting the battery to the tank. The hydraulic circuit is defined as including an inlet conduit connectable between the tank and the cell, and an outlet conduit connectable between the cell and the tank, gas produced during charging causing fluid flow through the outlet conduit and to the tank. In the fluid supply system of the present invention, the gas produced during charging causes fluid flow through the system.

100 Claims, 16 Drawing Sheets

U.S. PATENT DOCUMENTS

| | | |
|---|---|---|
| 3,616,824 A | 11/1971 | Orlando |
| 3,630,788 A | 12/1971 | Hennen |
| 3,664,876 A | 5/1972 | Carl |
| 3,772,087 A | 11/1973 | Schmechtig |
| 3,857,415 A | 12/1974 | Morin |
| 3,861,965 A | 1/1975 | O'Sullivan |
| 3,990,479 A | 11/1976 | Stinc et al. |
| 4,007,764 A | 2/1977 | Bandemor |
| 4,035,554 A | 7/1977 | Halberstadt et al. |
| 4,079,761 A | 3/1978 | Herbst, Sr. |
| 4,087,592 A | 5/1978 | Okazaki et al. |
| 4,113,925 A | 9/1978 | Kohler et al. |
| 4,278,742 A | 7/1981 | Oxenreider et al. |
| 4,289,176 A | 9/1981 | Evans |
| 4,330,017 A | 5/1982 | Satoh et al. |
| 4,353,968 A | 10/1982 | Boyle |
| 4,386,141 A | 5/1983 | Weidner et al. |
| 4,424,263 A | 1/1984 | Howell et al. |
| 4,497,880 A | 2/1985 | Kraft et al. |
| 4,522,896 A | 6/1985 | Iseard |
| 4,527,593 A | 7/1985 | Campau |
| 4,556,612 A | 12/1985 | Thibault et al. |
| 4,749,633 A | 6/1988 | Elias |
| 4,751,156 A | 6/1988 | Olimpio |
| 4,754,777 A | 7/1988 | Frode |
| 4,765,359 A | 8/1988 | Burnett |
| 4,823,685 A | 4/1989 | Boumans et al. |
| 5,002,100 A | 3/1991 | Frederick |
| 5,048,557 A | 9/1991 | Campau |
| 5,090,442 A | 2/1992 | Campau |
| 5,128,600 A | 7/1992 | Lim |
| 5,284,176 A | 2/1994 | Campau |
| 5,298,344 A | 3/1994 | Stocchiero |
| 5,422,199 A | 6/1995 | Adams et al. |
| 5,453,334 A | 9/1995 | Melichar |
| 5,543,243 A | 8/1996 | Brecht |
| 5,643,691 A | 7/1997 | Iwatsuki et al. |
| 5,832,946 A | 11/1998 | Campau |
| 5,853,913 A | 12/1998 | Stocchiero |
| 5,862,830 A | 1/1999 | Landau |
| 5,902,694 A | 5/1999 | Landau |
| 5,914,201 A | 6/1999 | Hughett et al. |
| 6,164,309 A | 12/2000 | Brecht |
| 6,213,145 B1 | 4/2001 | Crook et al. |
| 6,338,368 B1 | 1/2002 | Hassell |
| 6,446,681 B1 * | 9/2002 | Fitter .................. 137/260 |

* cited by examiner

BATTERY FLUID SUPPLY SYSTEM

RELATED APPLICATIONS

The present application is a continuation-in-part of application Ser. No. 10/093,336, filed Mar. 7, 2002, now U.S. Pat. No. 6,718,996 which is a continuation-in-part of application Ser. No. 09/829,766, filed Apr. 10, 2001, now U.S. Pat. No. 6,622,744 which is a continuation-in-part of application Ser. No. 09/545,939, filed Apr. 10, 2000, now U.S. Pat. No. 6,213,145, issued Apr. 10, 2001.

FIELD OF THE INVENTION

The present invention relates to liquid electrolytic batteries and, more particularly, to a fluid supply system for replenishing liquid electrolyte in the batteries.

BACKGROUND OF THE INVENTION

Battery-powered vehicles, such as, for example, golf carts and utility vehicles, require periodic charging of the batteries and replenishment of liquid electrolyte in the batteries. Typically, the filling systems and procedures require connection of the system to a fluid source, either pressurized or in a vacuum arrangement, the source being located offboard the vehicle. Flow of fluid through the system is caused by pressurized supply fluid or a vacuum applied to the filling system.

SUMMARY OF THE INVENTION

One problem with the above-described filling devices and procedures is that a separate fluid hook-up step is required before the liquid electrolyte can be replenished in the batteries.

Another problem with the above-described filling systems and procedures is that a separate source of pressure is required to supply fluid to the filling system. Such a separate pressurized source may be a pump or a vacuum connected to the filling system.

Yet another problem with the above-described filling systems and procedures is that, each time the batteries are replenished with fluid, the separate fluid source must be connected to the filling system, and fluid must be replenished, even if only a small amount of fluid must be replenished.

The present invention provides a system for supplying fluid to a battery, a vehicle and a method for supplying fluid to a battery which substantially alleviate one or more of the above described and other problems with the existing filling systems and procedures. More particularly, the present invention provides a fluid supply system in which the gas produced during charging causes fluid flow through the system.

In particular, the present invention provides a system for supplying fluid to a battery in a vehicle powered by the battery, the vehicle including a vehicle frame supporting the battery, the battery including a battery cell, fluid being transmittable to the cell, gas generated during charging of the battery being transmittable out of the cell. The system is defined as including a tank for holding fluid, and a hydraulic circuit connecting the battery to the tank. The hydraulic circuit is defined as including an inlet conduit connectable between the tank and the cell, and an outlet conduit connectable between the cell and the tank, gas produced during charging of the battery causing fluid flow through the outlet conduit and to the tank. Preferably, the outlet conduit collects gas transmitted from the cell in the form of gas bubbles with fluid entrapped between the bubbles, whereby the bubbles flow to the tank due to pressure build-up in the battery causing flow of fluid through the hydraulic circuit during charging.

Also, the present invention provides a system for supplying fluid to a battery in a vehicle powered by a first battery and a second battery. The system is defined as including a tank for holding fluid, and a hydraulic circuit connecting the tank to the first battery and to the second battery. The hydraulic circuit is defined as including a first inlet conduit between the tank and the first battery cell, and a first outlet conduit between the first battery cell and the tank, gas produced during charging causing fluid flow through the first outlet conduit and to the tank. The hydraulic circuit is defined as further including a second inlet conduit between the tank and the second battery cell, and a second outlet conduit between the second battery cell and the tank, gas produced during charging causing fluid flow through the second outlet conduit and to the tank.

Preferably, the hydraulic circuit has a first hydraulic circuit portion including the first inlet conduit and the first outlet conduit and a second hydraulic circuit portion including the second inlet conduit and the second outlet conduit. In some constructions, the first hydraulic circuit portion and the second hydraulic circuit portion provide separate, parallel hydraulic circuit portions. In other constructions, the first hydraulic circuit portion and the second hydraulic circuit portion are arranged in series.

In addition, the present invention provides a system for supplying fluid to battery, the system including a first tank for holding fluid, a second tank for holding fluid, and a hydraulic circuit connecting the battery to the first tank and to the second tank. The hydraulic circuit is defined as including a first conduit connectable between the first tank and the cell, a second conduit connectable between the cell and the second tank, and a third conduit connectable between the second tank and the first tank. The second tank is defined as collecting excess fluid supplied to the cell during fluid replenishment of the cell and collecting gas produced during charging, the gas causing fluid to move from the second tank to the first tank. Preferably, after charging, the second tank collects excess fluid supplied to the cell during fluid replenishment of the cell.

Further, the present invention provides a vehicle including a vehicle frame supported for movement over ground, an electric motor supported by the vehicle frame and operable to drive the vehicle, a battery supported by the vehicle frame and electrically connectable with the motor to selectively power the motor, the battery including a battery cell, fluid being transmittable to the cell, gas generated during charging of the battery being transmittable out of the cell, a tank for holding fluid, and a hydraulic circuit connecting the battery to the tank. The hydraulic circuit is defined as including an inlet conduit connectable between the tank and the cell, and an outlet conduit connectable between the cell and the tank, gas produced during charging causing fluid flow through the outlet conduit and to the tank.

Also, the present invention provides a vehicle including a vehicle frame, an electric motor, a first battery and a second battery supported by the vehicle frame and electrically connectable with the motor to selectively power the motor, the first battery including a first battery cell, the second battery including a second battery cell, fluid being transmittable to the first battery cell and to the second battery cell, gas generated during charging being transmittable out of the first battery cell and out of the second battery cell, a tank for holding fluid, a hydraulic circuit connecting the first battery and the second battery to the tank. The hydraulic circuit is defined as including a first inlet conduit connectable between the tank and the first battery cell, a first outlet conduit connectable between the first battery cell and the tank, gas produced during charging causing fluid flow through the first outlet conduit into the tank, a second inlet conduit connectable between the tank and the second battery cell, and a second outlet conduit connectable between the second battery cell and the tank, gas produced during charging causing fluid flow through the second outlet conduit and to the tank.

In addition, the present invention provides a vehicle including a vehicle frame supported for movement over ground, an electric motor supported by the vehicle frame and operable to selectively drive the vehicle, a battery supported by the vehicle frame and electrically connectable with the motor to selectively power the motor, the battery including a battery cell, fluid being transmittable to the cell, gas generated during charging of the battery being transmittable out of the cell, a first tank for holding fluid, a second tank for holding fluid and a hydraulic circuit connecting the battery to the first tank and to the second tank. The hydraulic circuit is defined as including a first conduit connectable between the first tank and the cell, a second conduit connectable between the cell and the second tank, and a third conduit connectable between the second tank and the first tank. The second tank is defined as collecting excess fluid supplied to the cell during fluid replenishment of the cell. The second tank is defined as collecting gas produced during charging of the battery, the gas causing fluid to move from the second tank to the first tank.

Further, the present invention provides a tank for holding fluid in a fluid supply system, the fluid supply system supplying fluid to a battery in a vehicle selectively powered by the battery, the vehicle including a vehicle frame supporting the battery, the battery including a battery cell, the fluid supply system including a hydraulic circuit, the hydraulic circuit including an inlet conduit connected to the cell and an outlet conduit connected to the cell. The tank is defined as including a container for holding fluid and defining a tank outlet and a tank inlet, the tank inlet being below the tank outlet, the tank outlet being connected with the inlet conduit, the tank inlet being connected with the outlet conduit, the container having a bottom wall, a tube having an inlet end positioned adjacent the tank inlet and an outlet end positioned above the inlet end, the inlet end being spaced above the bottom wall, a portion of the outlet conduit extending into the inlet end, and a tray supported adjacent the outlet end of the tube and communicating with the tank outlet. Gas produced during charging of the battery flows from the outlet conduit into the tube, causing fluid to move from the tube into the tray by percolation. Fluid in the tray flows into the inlet conduit.

Also, the present invention provides a tank for holding fluid in a fluid supply system, the tank including a container for holding fluid and defining a tank outlet, a vent outlet and a tank inlet. The tank outlet is defined as being connected to the inlet conduit, and the tank inlet is defined as being connected with the outlet conduit. The container is defined as including a container wall providing a first container portion and a second container portion, the tank outlet being in the first container portion, the tank inlet and the vent outlet being in the second container portion. Initially, a first container portion pressure and a second container portion pressure are substantially equal. Thereafter, gas produced during charging of the battery is vented from the second container portion causing a pressure differential of the second container portion pressure being less than the first container portion pressure, the pressure differential causing fluid flow from the first container portion, through the hydraulic circuit and to the second container portion.

In addition, the present invention provides a tank for holding fluid in a fluid supply system, the tank is defined as including a first container portion defining a fill inlet for receiving fluid into the system, and a second container portion in fluid communication with the first container portion and defining a return inlet connected to the outlet conduit such that fluid and gas flow into the second container portion, the second container portion also defining a vent outlet operable to allow gas to vent from the system, one of the first container portion and the second container portion including a fluid supply outlet connected to the inlet conduit to supply fluid to the battery.

Further, the present invention provides a method for supplying fluid to a battery in a vehicle selectively powered by the battery. The method is defined as including the acts of providing a system for supplying fluid to the battery, the system including a tank for holding fluid and a hydraulic circuit connecting the battery to the tank, the hydraulic circuit including an inlet conduit connectable between the tank and the cell, and an outlet conduit connectable between the cell and the tank, supplying fluid to the tank, allowing fluid flow from the tank through the inlet conduit to the cell, charging the battery, the charging act including producing gas, an causing flow of fluid through the outlet conduit and to the tank, the causing act including using gas produced during the charging act to cause fluid flow through the outlet conduit and to the tank.

Also, the present invention provides a method for supplying fluid to a battery in a vehicle selectively powered by a first battery and a second battery. The method is defined as including the acts of providing a system for supplying fluid to the battery, this system including a tank for holding fluid, and a hydraulic circuit connecting the battery to the tank, the hydraulic circuit including a first inlet conduit connectable between the tank and the first battery cell, a first outlet conduit connectable between the first battery cell and the tank, a second inlet conduit connectable between the tank and the battery cell, and a second outlet conduit connectable between the second battery cell and the tank, supplying fluid to the tank, allowing fluid flow from the tank through the first inlet conduit to the first battery cell, allowing fluid flow from the tank through the second inlet conduit to the second battery cell, charging the first battery and the second battery, the charging act including producing gas, and causing flow of fluid through the first outlet conduit and to the tank and through the second outlet conduit and to the tank, the causing act including using gas produced during the charging act to cause fluid flow through the first outlet conduit and through the tank and through the second outlet conduit and to the tank.

In addition, the present invention provides a method for supplying fluid to a battery in a vehicle selectively powered by the battery, the method including the acts of providing a system for supplying fluid to the battery, the system including a first tank for holding fluid, a second tank for holding fluid, and a hydraulic circuit connecting the battery to the first tank and to the second tank, the hydraulic circuit including a first conduit connectable between the first tank and the cell, a second conduit connectable between the cell and the second tank, and a third conduit connectable between the second tank and the first tank, supplying fluid to the first tank, allowing fluid flow from the first tank through the first conduit to the cell, allowing excess fluid to flow through the second conduit into the second tank, charging the battery, the charging act including producing gas, and causing flow of fluid from the second tank, through the third conduit and to the first tank, the causing act including using gas produced during the charging act to cause fluid flow through the third conduit and to the first tank.

One independent advantage of the present invention is that, in some constructions, the fluid source is supported on the vehicle. Therefore, a separate fluid hook-up step is not required before the liquid electrolyte can be replenished in the batteries. The fluid supply system may automatically replenish the batteries.

Another independent advantage of the present invention is that, in some constructions, the fluid supply system utilizes the pressure of the gas produced during charging to cause fluid flow through the fluid supply system. Therefore, a separate source of pressure, such as a pump or a vacuum, is not required.

Yet another independent advantage of the present invention is that, in some constructions, the fluid supply system automatically replenishes the necessary fluid to the batteries when necessary and each time the batteries are to be replenished. The operator is only required to add fluid to the system when no fluid remains in the fluid source after replenishment.

Other independent features and independent advantages of the present invention are apparent to those skilled in the art upon review the following detailed description, claims and drawings.

BRIEF DESCRIPTION OF THE DRAWINGS

FIG. 17 is a partial schematic view of a twelfth alternative construction of the fluid supply system.

Figure 1:
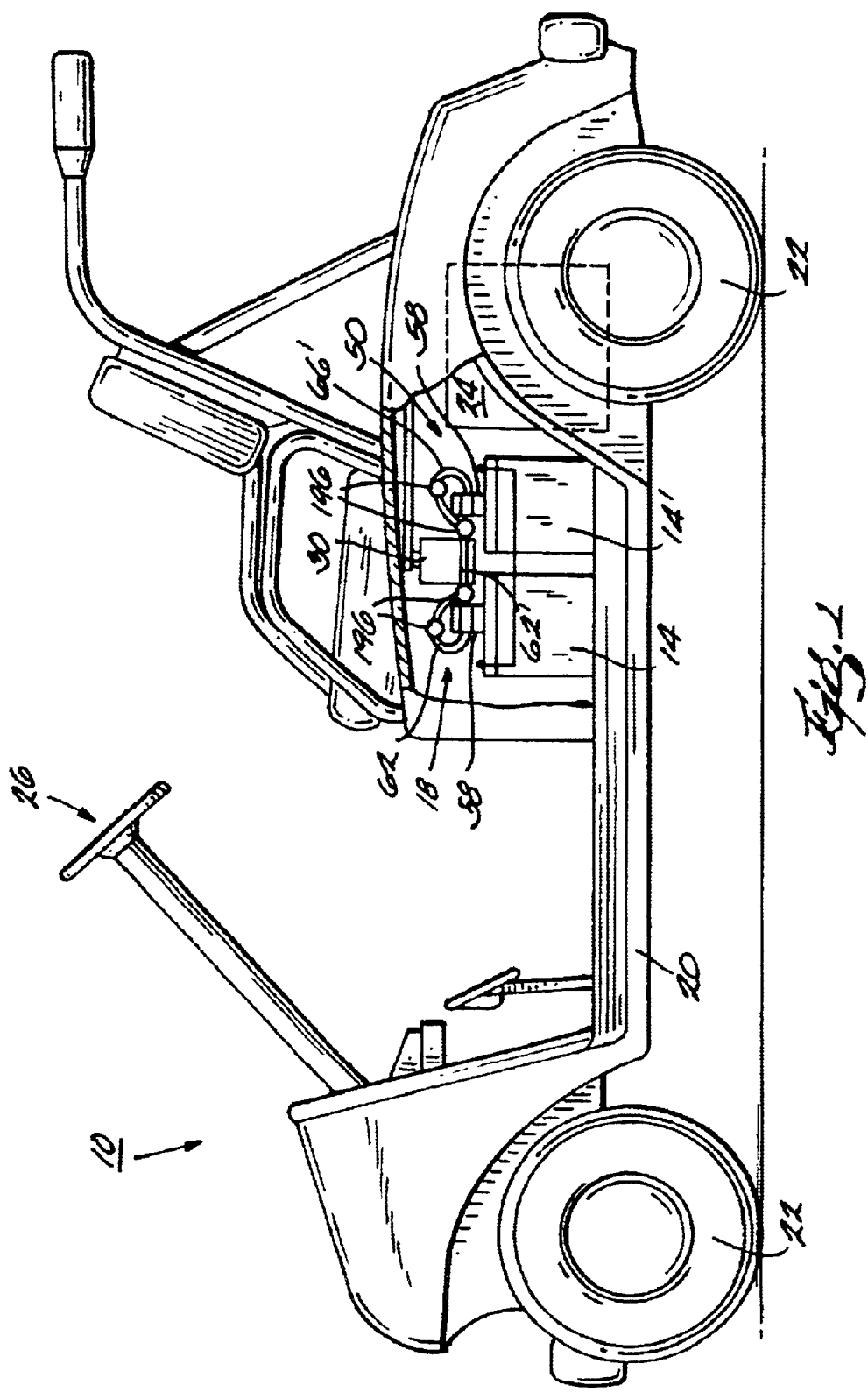
FIG. 1 is a side view of a vehicle and a system for supplying fluid to a battery embodying the present invention.

Before one embodiment of the invention is explained in detail it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A vehicle 10, such as, for example, an electric car, a golf car or a utility vehicle, selectively powered by a least one electrolyte battery 14 and including a system 18 for supplying fluid to the battery 14, the fluid supply system 18 embodying the invention, is illustrated in FIG. 1. The vehicle 10 includes a frame 20 supported by wheels for movement over ground. The vehicle 10 also includes an electric motor 24 (schematically illustrated) supported on the frame 20 and electrically connectable with a plurality of batteries 14 (two shown) to selectively power the vehicle 10. A steering assembly 26 (partially illustrated) is provided to control movement of the vehicle 10.

The fluid supply system 18 includes a source of fluid, such as a tank 30 for holding fluid. In the illustrated construction, the tank 30 is supported on the frame 20. The tank 30 includes (see FIG. 2) a container 34 into which fluid is poured through a removable cap 38 and from which fluid is supplied to the batteries 14. The tank 30 may also include a strainer element (not shown) for removing debris from the fluid supply and preventing the debris from entering the tank 30. The tank 30 also includes a vent 42 for venting battery gas generated during operation and charging of the batteries 14. In the illustrated construction, the vent 42 includes a flame arrestor 46 to prevent any flame from passing into the container 34, should the vented gases ignite.

Figure 12:
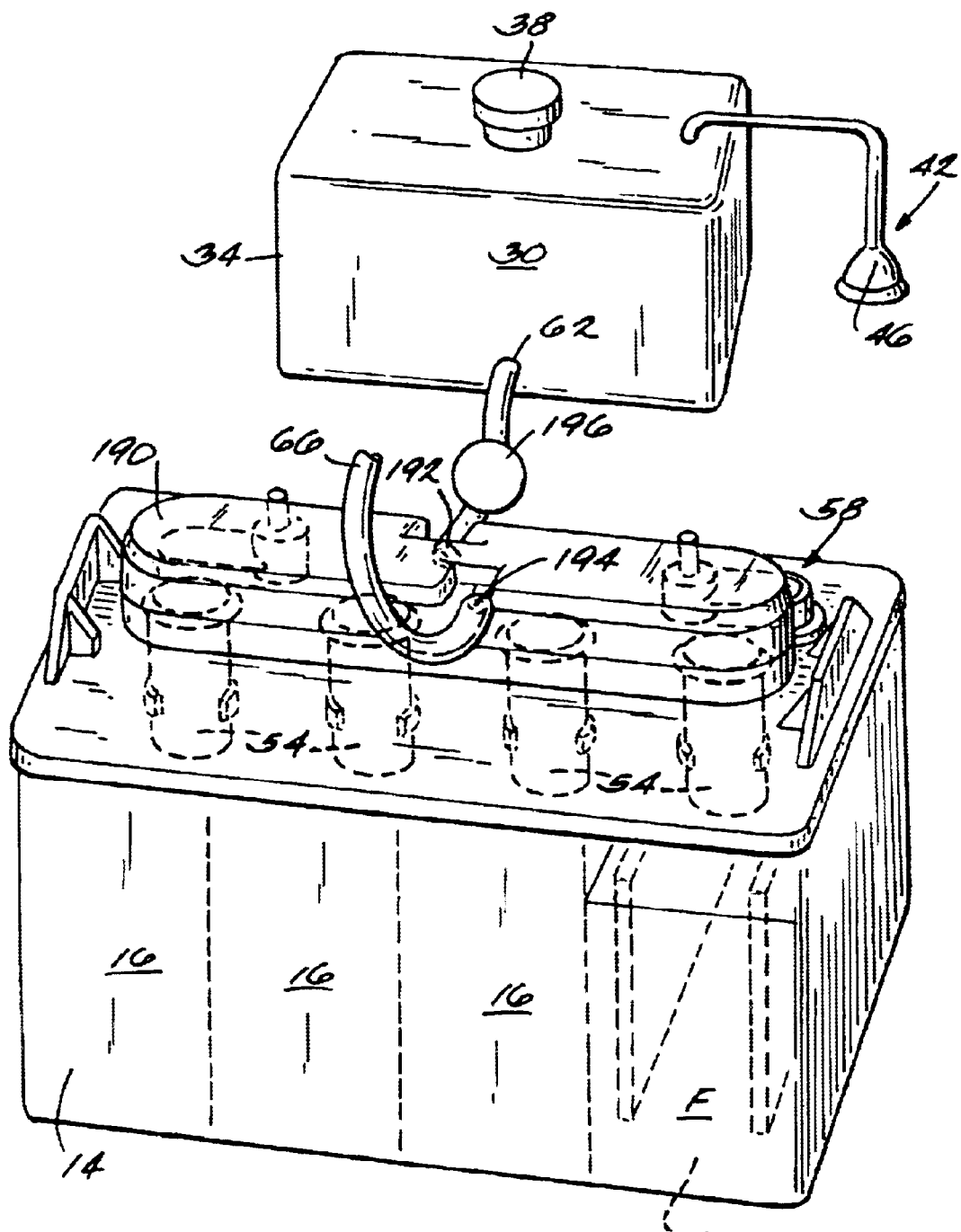
FIG. 12 is a perspective view of a battery and a portion of the fluid supply system.

The fluid supply system 18 also includes a hydraulic circuit 50 connecting the battery 14 to the tank 30. The hydraulic circuit 50 includes a fluid supply member 54 (schematically illustrated in FIG. 2) connectable to the cell 16. Fluid is supplied to the cell 16 through the fluid supply member 54, and gases are vented from the cell 16 through the fluid supply member 54. As explained below in more detail, the hydraulic circuit 50 may include a filling pod 58 having a number of fluid supply members 54 (as shown in FIG. 12), each associated with and supplying fluid to a cell 16.

The hydraulic circuit 50 also includes (see FIGS. 1–2) an inlet conduit 62 connectable between the tank 30 and the inlet of the fluid supply member 54 to connect the tank 30 to the cell 16. Also, the hydraulic circuit 50 includes an outlet conduit 66 connectable between the fluid supply member 54 (of the filling pod 58 in the illustrated construction) and the tank 30 to connect the cell 16 back to the tank 30. In the illustrated construction, the hydraulic circuit 50 connects the tank 30 to the cell 16 in a closed loop.

Figure 2:
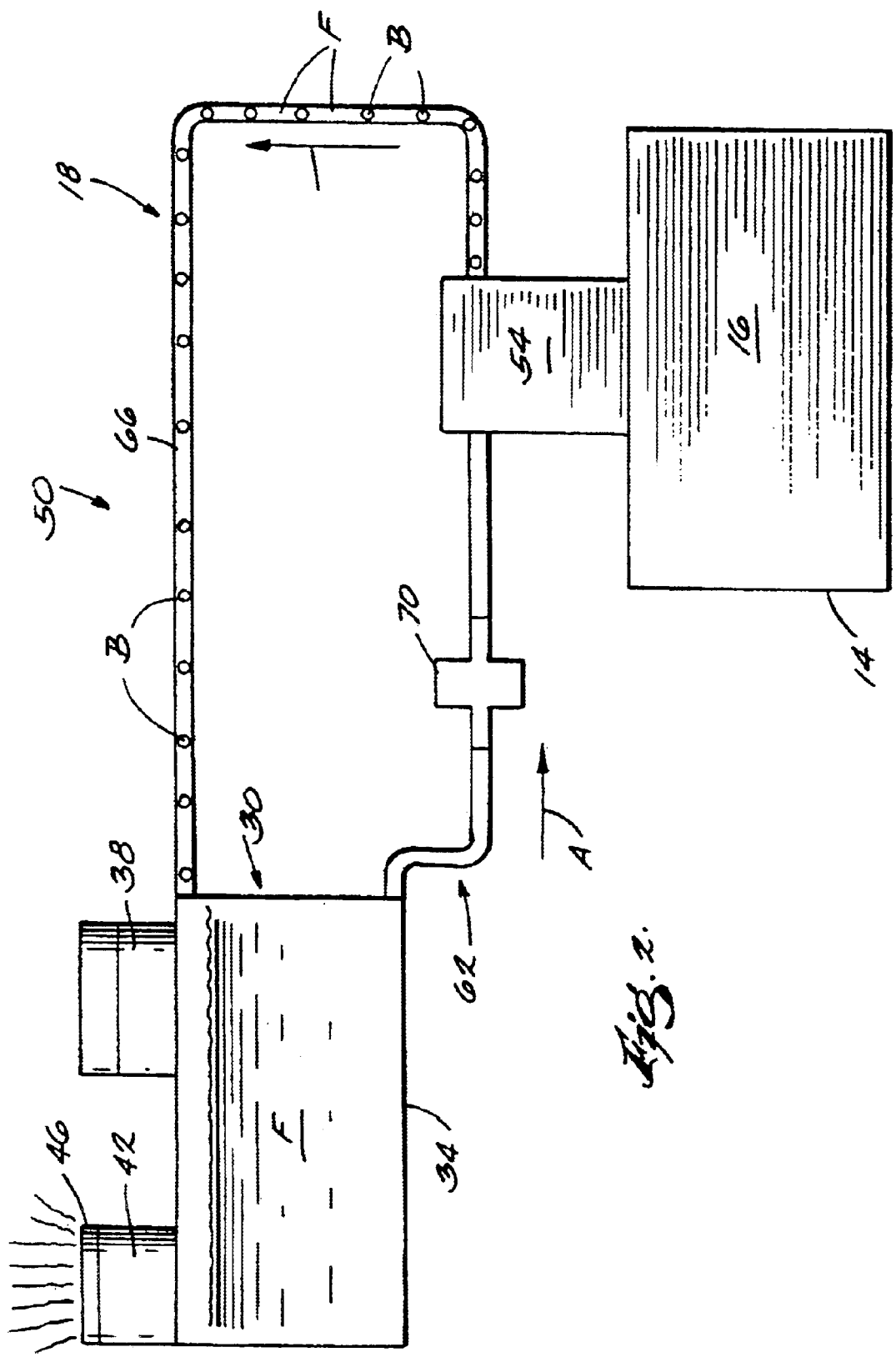
FIG. 2 is a partial schematic of a fluid supply system.

As shown in FIG. 2, a valve 70 controls the flow of fluid through the inlet conduit 62. In the illustrated construction, the valve 70 provides flow through the inlet conduit 62 only in the direction from the tank 30 to the cell 16 (in the direction of arrow A). In the illustrated construction, the valve 70 is a check valve, such as a miniature diaphragm check valve, Part No. A687 from Walworth Sales and Marketing, 100 Wisconsin Avenue, Walworth, Wis. In other constructions (see, for example, FIGS. 3 and 6), the valve 70A or 70D is a mechanical valve or an electronic valve (schematically illustrated).

The vehicle 10 also includes an on-board computer 72. The on-board computer 72 is similar to the controller described in U.S. Pat. No. 6,087,805, which is hereby incorporated by reference.

Generally, the on-board computer 72 records the amount of energy in the battery 14 and determines when to allow the battery 14 to be charged. When the energy in the battery 14 falls below a predetermined level, the on-board computer 72 will allow the battery to be charged.

In some constructions, the on-board computer 72 also controls the replenishment of battery fluid, as discussed below in more detail. In constructions including an electronic valve (see, for example, FIG. 3), the operation of the valve 70A is controlled by the onboard computer 72A.

In the illustrated construction (see FIG. 1), the hydraulic circuit 50 connects a first battery 14 and a second battery 14' to the tank 30. The batteries 14 and 14' are identical, and components corresponding to or associated with the second battery 14' are indicated by the same reference number "'".

In the construction illustrated in FIGS. 1–2, the hydraulic circuit 50 connects the tank 30 and the batteries 14 and 14' in series and in a closed loop. The first inlet conduit 62 is connected between the tank 30 and the first fluid supply member 54 (of the first filling pod 58) to supply fluid from the tank to the first battery cell 16. The second inlet conduit 62' is connected between the first fluid supply member 54 (of the first filling pod 58) and the second fluid supply member 54' (of the second filling pod 58') and provides a portion of the first outlet conduit 66. The first inlet conduit 62' supplies fluid from the tank 30 to the second battery cell 16'. The second outlet conduit 66' is connected between the second fluid supply member 54' (of the second filling pod 58') and the tank 30 to connect the battery cells 16 and 16' back to the tank 30.

In the illustrated series arrangement, fluid is initially supplied to the tank 30. Fluid flows through the first inlet conduit 62 to the first fluid supply member 54 (of the first filling pod 58) to replenish the first battery cell 16. When the first battery cell 16 is replenished, any excess fluid flows through the second inlet conduit 62' to the second fluid supply member 54' (of the second filling pod 58') to replenish the second battery cell 16'.

In the illustrated closed loop arrangement, any excess fluid flowing from the second fluid supply member 54' (of the second filling pod 58') after the second battery cell 16' is replenished flows back to the tank 30. Gas produced during charging of the batteries 14 and 14' causes the fluid to flow through the second outlet conduit 66' and to the tank 30.

If excess fluid remains in the tank 30 after replenishment, the fluid may be automatically re-supplied through the fluid supply members 54 and 54' (through the filling pods 58 and 58') to the batteries 14 and 14' as needed during operation of the vehicle 10. After charging, the gas is vented from the hydraulic circuit 50, reducing the back pressure in the hydraulic circuit 50. When the head pressure of fluid from the tank 30 in the inlet conduit 62 is greater than the back pressure on the valve 70 caused by the fluid and gas downstream of the valve 70, the valve 70 opens, allowing fluid to flow through the hydraulic circuit 50 to the battery cells 16 and 16' to replenish the battery cells 16 and 16'. Any excess fluid after this replenishment remains in the second outlet conduit 66' until the next charging, and the cycle repeats.

In the illustrated closed loop arrangement, the operator has an indication as to whether additional fluid is required to be added to the batteries 14 and 14' at times other than during normal electrolyte fluid replenishment. Accordingly, fluid can be added to the tank 30, as necessary, when no fluid returns to the tank 30. In an open loop arrangement (not shown), the operator continues to add fluid to the source (such as the tank 30) until fluid flows from the outlet conduit (such as outlet conduit 66 or 66'), which, in such constructions, is not connected back to the source.

As shown in more detail in FIG. 2, the fluid supply system 18 supplies fluid to the batteries 14 (one shown) powering the vehicle 10. The fluid supply member 54 is capable of replenishing fluid in the battery cell 16. Fluid flows into the cell 16 and automatically stops when the fluid level reaches a predetermined level in the cell 16. The fluid supply member 54 is capable of transmitting out of the cell 16 gases, such has hydrogen and oxygen, generated during charging of the battery 14.

As shown in FIG. 2, during charging of the battery 14, gas bubbles B are produced. The valve 70 closes due to the back pressure of the gas on the valve 70. The gas bubbles B are collected in the outlet conduit 66 and are transmitted from the battery cell 16. Fluid F is entrapped between the gas bubbles B. When the head pressure of the gas bubbles B in the outlet conduit 66 is greater than the back pressure of the fluid F in the outlet conduit 66, the entrapped fluid F and gas bubbles B flow to the tank 30, i.e., the hydraulic circuit 50 is "burped" of fluid. The pressure build-up in the battery cell 16 thus causes flow of fluid F through the hydraulic circuit 50 during charging. The battery gas generated during operation and charging is vented through the vent 42 and through the flame arrestor 46.

After the hydraulic circuit 50 is "burped" and cleared of fluid F, gas flows freely through the outlet conduit 66. The head pressure of fluid from the tank 30 in the inlet conduit 62 is then greater than the back pressure on the valve 70, and the valve 70 opens, allowing fluid to flow through the hydraulic circuit 50 to the battery cells 16 and 16' to replenish the battery cells 16 and 16'. Any excess fluid after this replenishment remains in the second outlet conduit 66'. As charging of the battery 14 continues, the cycle repeats.

Figure 3:
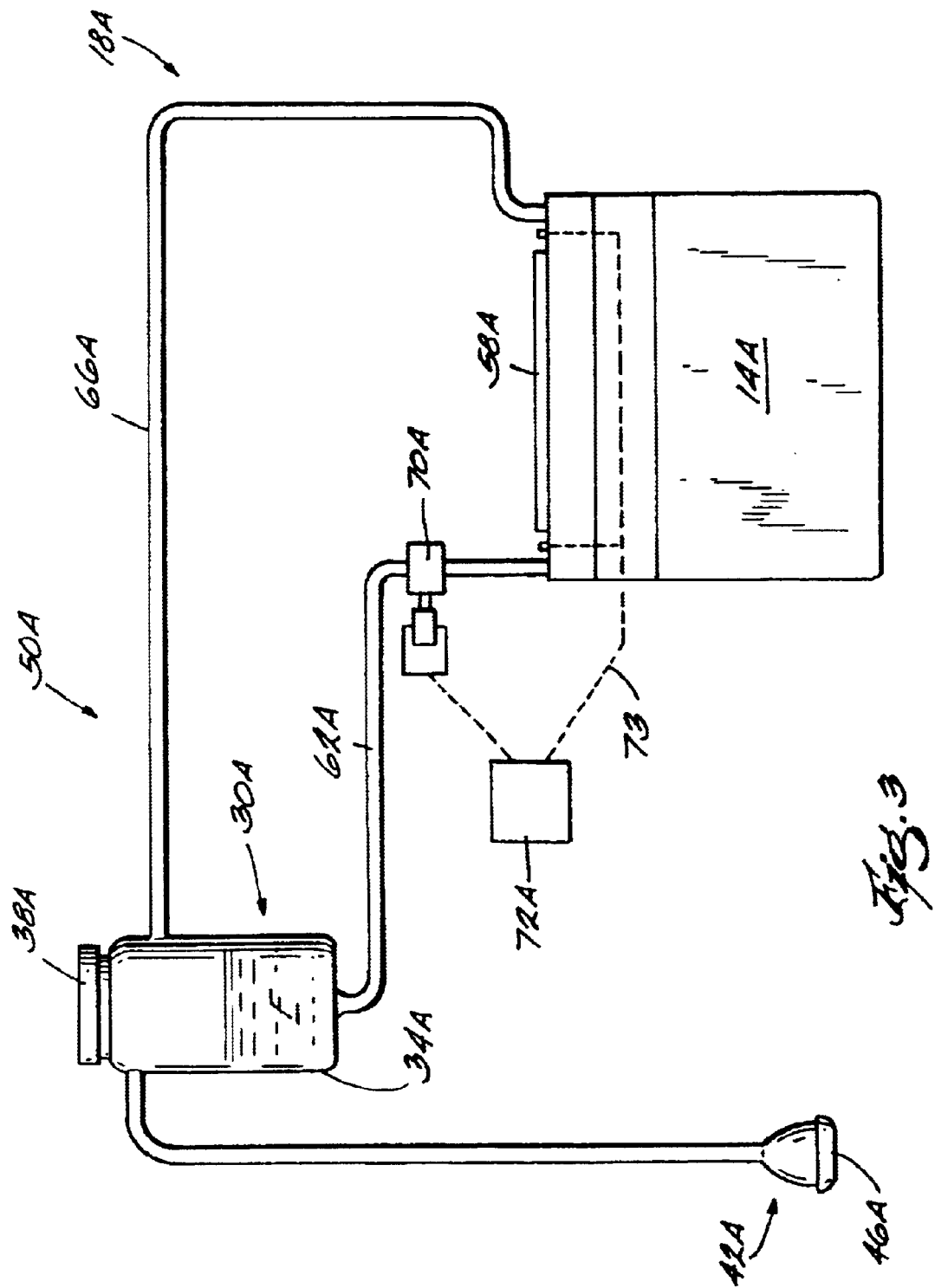
FIG. 3 is a partial schematic of a first alternative construction of the fluid supply system.

A first alternative construction of a fluid supply system 18A is illustrated in FIG. 3. Common elements are identified by the same reference number "A".

As shown in FIG. 3, the valve 70A (schematically illustrated) may be a mechanical valve or an electronic valve. The valve 70A is connected to the on-board computer 72A, either electrically or mechanically, and is responsive to the on-board computer 72A. During charging, the on-board computer 72A is electrically connected to a battery circuit 73 to read the energy level of the battery 14A. The connection between the on-board computer 72A and the valve 70A triggers the closing of the valve 70A, trapping gases produced during charging in the inlet conduit 62A, the battery cell 16A and the outlet conduit 66A. When the gas pressure reaches a given pressure, i.e., a sufficient head pressure of gas to overcome the back pressure of fluid F in the outlet conduit 66, fluid is pushed through the outlet conduit 66A and back to the tank 30A.

In the illustrated construction, the on-board computer 72A also controls the supply of fluid to the battery 14A. The on-board computer 72A monitors the energy (in amperehours) removed from the battery 14A and uses the record of removed energy to determine the timing of battery charging. The on-board computer 72A also determines the total duration of a charging cycle by measuring the rate of change of the charging current. The on-board computer 72A determines the amount of charge on the battery 14A by measuring the energy added to the battery 14A during charging. In addition, by keeping a history of the removal and supply of energy to the battery 14A during operation and charging, respectively, the on-board computer 72A determines when the valve 70A should be opened so that fluid F is supplied to the battery 14A.

In the construction illustrated in FIG. 3, the on-board computer 72A controls fluid replenishment in the fluid supply system 18A. During charging, when the on-board computer 72A reads a given battery voltage, i.e., fifty-eight volts of charge on the battery 14A, the on-board computer 72A opens the valve 70A to allow fluid to flow into the battery 14A for a predetermined amount of time to assist with battery charging. The fluid coming into the battery 14A forces the gas produced during charging to flow through the fluid supply system 18A. The on-board computer 72A closes the valve 70A after the predetermined amount of time to stop the flow of fluid into the battery 14A. Charging continues, and the battery 14A continues to gas. In the illustrated construction, the continued gassing forces the excess fluid through the fluid supply system 18A and back to the supply tank 30A.

Figure 4:
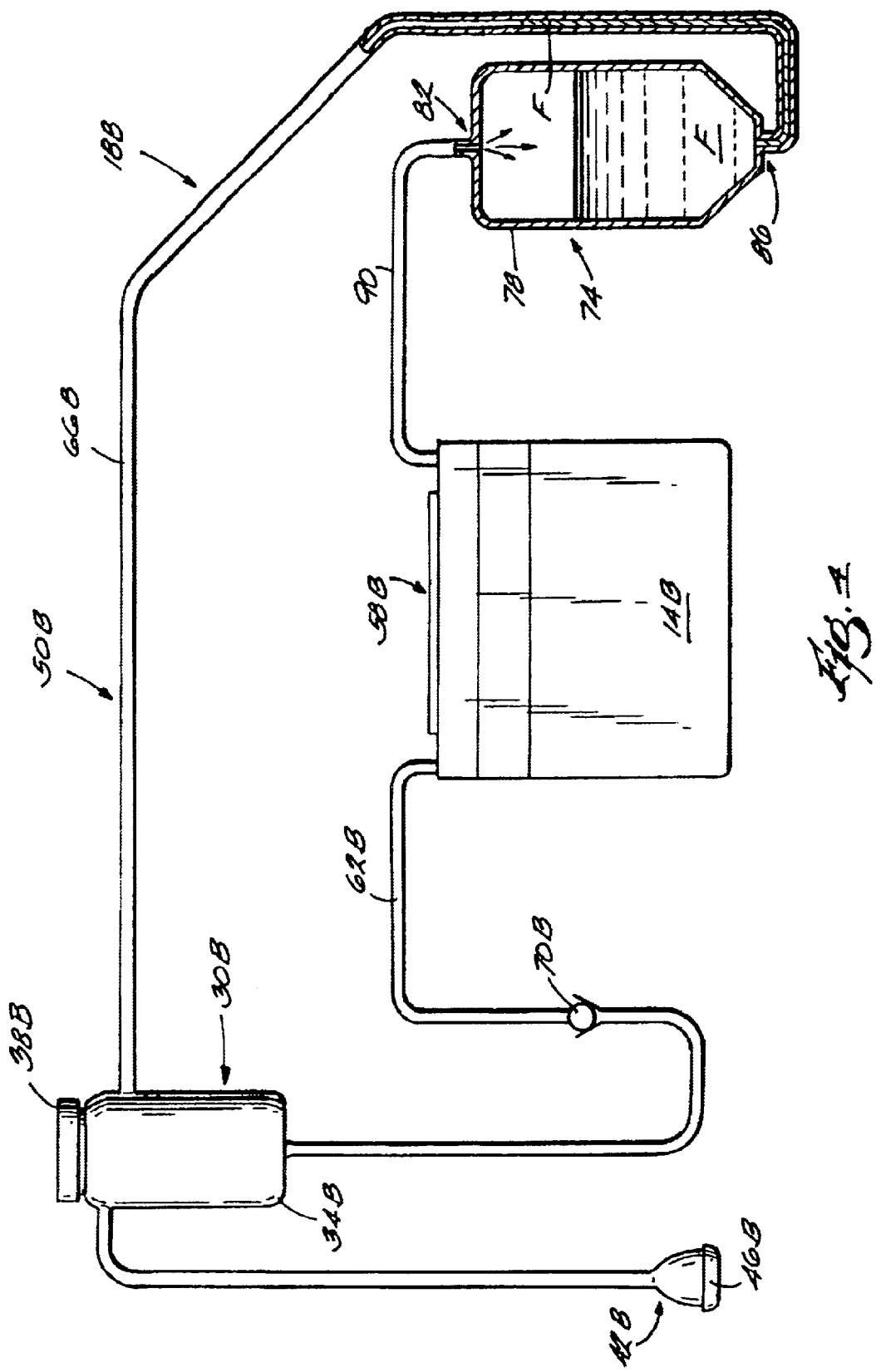
FIG. 4 is a partial schematic view of a second alternative construction of the fluid supply system.

A second alternative construction of a fluid supply system 18B is illustrated in FIG. 4. Common elements are identified by the same reference number "B".

As shown in FIG. 4, the hydraulic circuit 50B also includes a second or overflow tank 74 as a lower reservoir. The overflow tank 74 includes a container 78 having an inlet 82 and an outlet 86. An overflow conduit 90 is connected between the fluid supply member (not shown but provided by the filling pod 58B) and the overflow tank 74. The outlet conduit 66B is connected between the overflow tank 74 and the first tank 30B to connect the fluid supply member (of the filling pod 58B) and the battery cell 16B back to the first tank 30B.

In operation, one of the tanks 30B or 74 is initially filled with fluid. In the illustrated construction, the first tank 30B is filled with fluid. Gravity forces fluid through the inlet conduit 62B to the fluid supply member 54B to replenish the battery cell 16B. Any excess fluid flows through the overflow conduit 90 to the overflow tank 74, in which it is stored until charging.

In another construction (not shown), the overflow tank 74 may include a cap (similar to the cap 38), and fluid may be initially supplied to the overflow tank 74. In such a construction, the fluid is stored in the overflow tank 74 until charging of the batteries 14.

In either construction, gas is produced during charging of the battery 14B and is trapped between the valve 70B and the fluid-filled overflow tank 74. The gas collects in the overflow tank 74. When the pressure in the overflow tank 74 reaches a given pressure, i.e., a sufficient head pressure of gas to overcome the back pressure of fluid F in the overflow tank 74 and in the outlet conduit 66B, the fluid is pushed from the overflow tank 74, through the outlet conduit 66B and to the first tank 30B. The gas is then vented through the vent 42B and through the flame arrestor 46B.

Once the pressure in the hydraulic circuit 50 is reduced, the valve 70B opens, allowing fluid to flow from the first tank 30B, through the inlet conduit 62B and to the fluid supply member 54B to replenish the battery cell 16B. The fluid supply member 54B automatically replenishes the battery cell 16B to the correct level. Any excess fluid flows into the overflow tank 74 in which it is stored until the next charging, and the cycle repeats.

Figure 5:
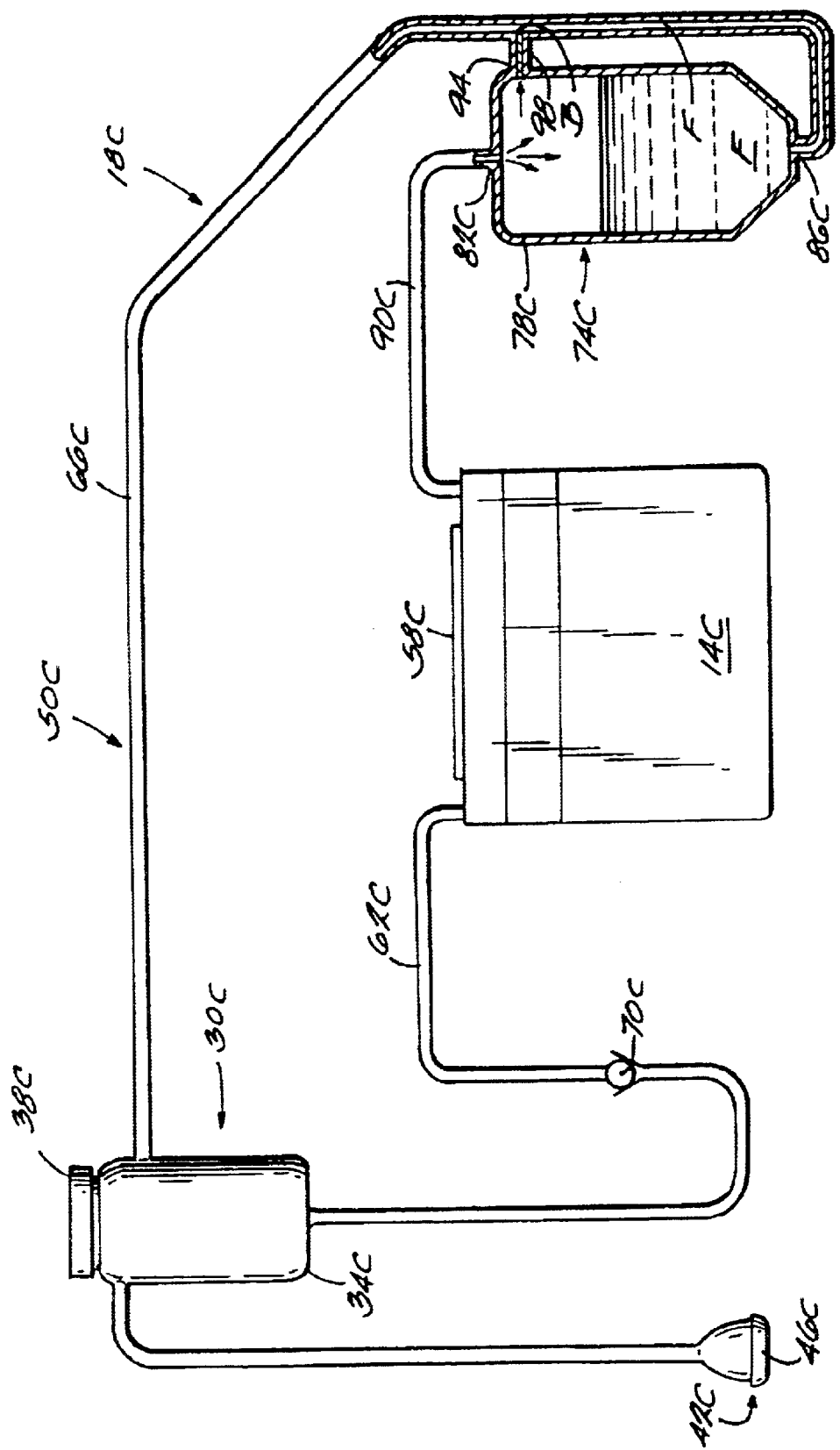
FIG. 5 is a third alternative construction of the fluid supply system.

A third alternative construction of a fluid supply system 18C is illustrated in FIG. 5. Common elements are identified by the same reference number "C".

As shown in FIG. 5, the overflow tank 74C is provided by a container 78C having an inlet 82C, a first outlet 86C and a second outlet 94. A vent conduit 98 connects the second outlet 94 to the outlet conduit 66C.

Preferably, the first outlet 86C is positioned below the second outlet 94. The first outlet 86C is configured to pass fluid F and gas bubbles B, and the second outlet 94 is configured to pass only gas bubbles B. The size of the second outlet 94 (and the flow rate of gas through the second outlet 94) is determined based upon the amount of gas produced during charging of the battery 14C (which is based upon the amperage used to charge the battery 14C). Preferably, the second outlet 94 is configured to pass gas bubbles B from the battery cell 16C, thereby allowing fluid F into the battery cell 16C. The second outlet 94 is configured to pass a first amount of gas bubbles B and to retain a second amount of gas bubbles B in the overflow tank 74C. The second amount of gas bubbles B causes flow of fluid F from the first outlet 86C, through the outlet conduit 66C and to the first tank 30C.

During charging, gas is produced, and pressure builds in the hydraulic circuit 50C between the valve 70C and the fluid-filled overflow tank 74C. A slow rate of gas, i.e., a first amount of gas bubbles B, escapes from the overflow tank 74C through the second outlet 94, and, when the pressure in the overflow tank 74C reaches a given pressure, caused by a second amount of gas bubbles B, fluid is pushed from the overflow tank 74C, through the first outlet 86C, through the outlet conduit 66C and to the first tank 30C.

The second outlet 94, connecting the overflow tank 74C to the outlet conduit 66C, allows a slow flow rate of gas to escape the overflow tank 70C. This allows entry of fluid into the overflow tank 74C from the battery cell 16C. The second outlet 94 is large enough to allow gas to escape from the overflow tank 74C but is small enough to allow a building of pressure during charging to cause fluid to flow to the first tank 30C.

Figure 6:
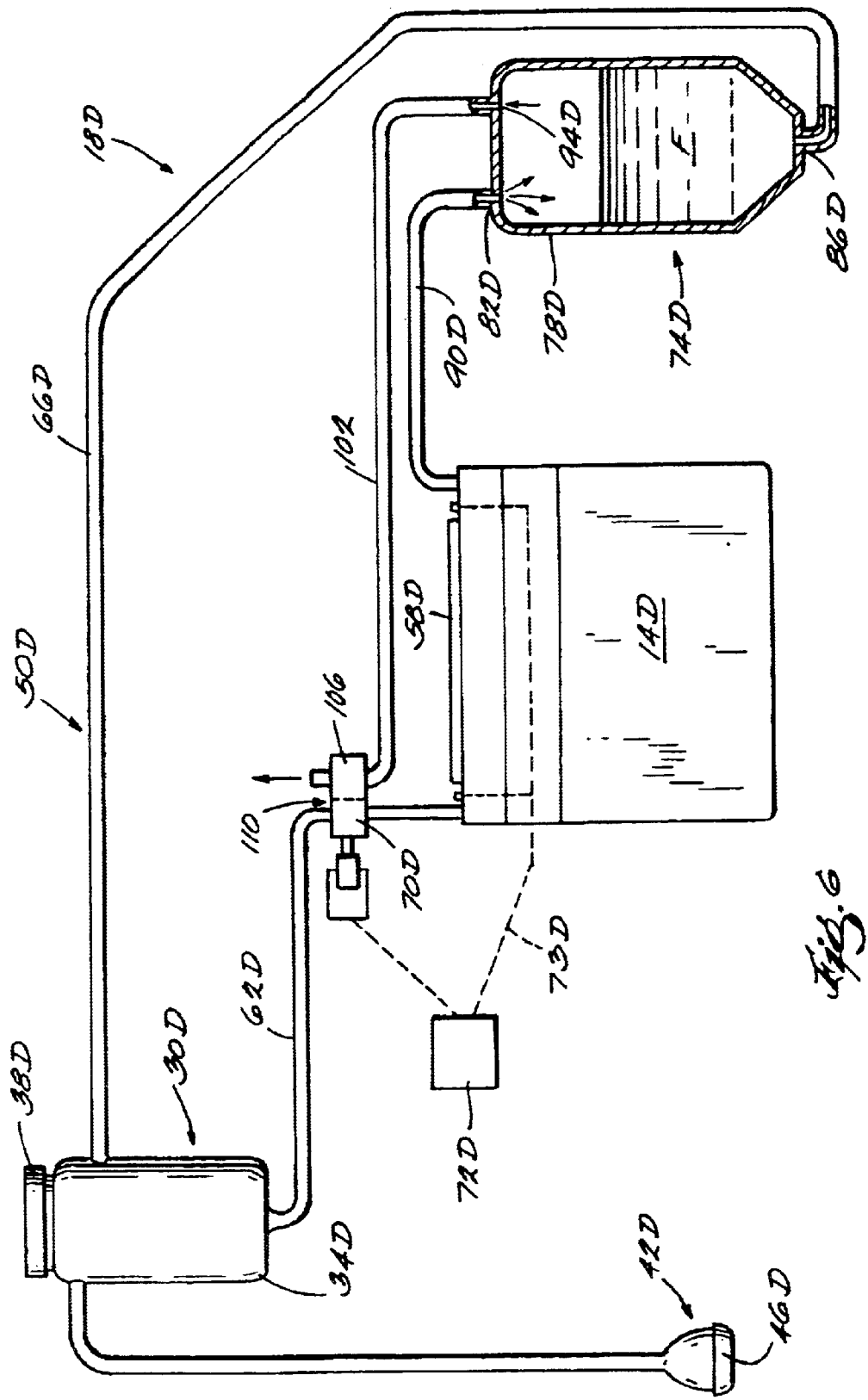
FIG. 6 is a fourth alternative construction of the fluid supply system.

A fourth alternative construction of a fluid supply system 18D is illustrated in FIG. 6. Common elements are identified by the same reference number "D".

As shown in FIG. 6, the hydraulic circuit 50D includes an overflow tank 74D provided by a container 78D having an inlet 82D and first outlet 86D and a second outlet 94D. A vent conduit 102 is connected to the second outlet 94D. A vent valve 106 controls the flow of gas through the vent conduit 102. In the illustrated construction, the valve 70D and the vent valve 106 are provided by a single valve assembly 110.

During fluid replenishment, the valve 70D and the vent valve 106 are open. Fluid flows through the inlet conduit 62D to the fluid supply member 54D to replenish the battery cell 16D. Any excess fluid flows to the overflow tank 74D. Through the vent conduit 102 and through the open vent valve 106, gas is vented from the battery cell 16D, to allow fluid into the battery cell 16D, and from the overflow tank 74D, to allow excess fluid to flow into the overflow tank 74D.

During charging, the connection between the on-board computer 72D and the valve assembly 110 causes the valve 70D and the vent valve 106 to close, trapping gases produced during charging between the valve 70D and the fluid-filled overflow tank 74D. When the pressure in the overflow tank 74D reaches a given pressure, the fluid is pushed from the overflow tank 74D to the first tank 30D.

At or near the end of charging, the valve 70D opens, allowing gravity to force the fluid through the hydraulic circuit to replenish the battery cell 16D, and the vent valve 106 opens, allowing gas to vent from the battery cell 16D and from the overflow tank 74D. Any excess fluid flows to the overflow tank 74D in which it is stored until the next charging, and the cycle continues.

In an alternative construction (not shown), the second outlet 94D may be sized so that a vent conduit 102 and a vent valve 106 are not required. In such a construction, the size of the second outlet 94D allows sufficient gas to escape so that fluid can enter the battery cell 14D and the overflow tank 74D. However, the second outlet 94D is small enough to allow pressure to build in the overflow tank 74D to cause fluid to flow from the overflow tank 74D to the first tank 30D. The size of the second outlet 94D (and the flow rate of gas through the second outlet 94D) is determined based upon the amount of gas produced during charging of the battery 14D (which is based upon the amperage used to charge the battery 14D).

Figure 7:
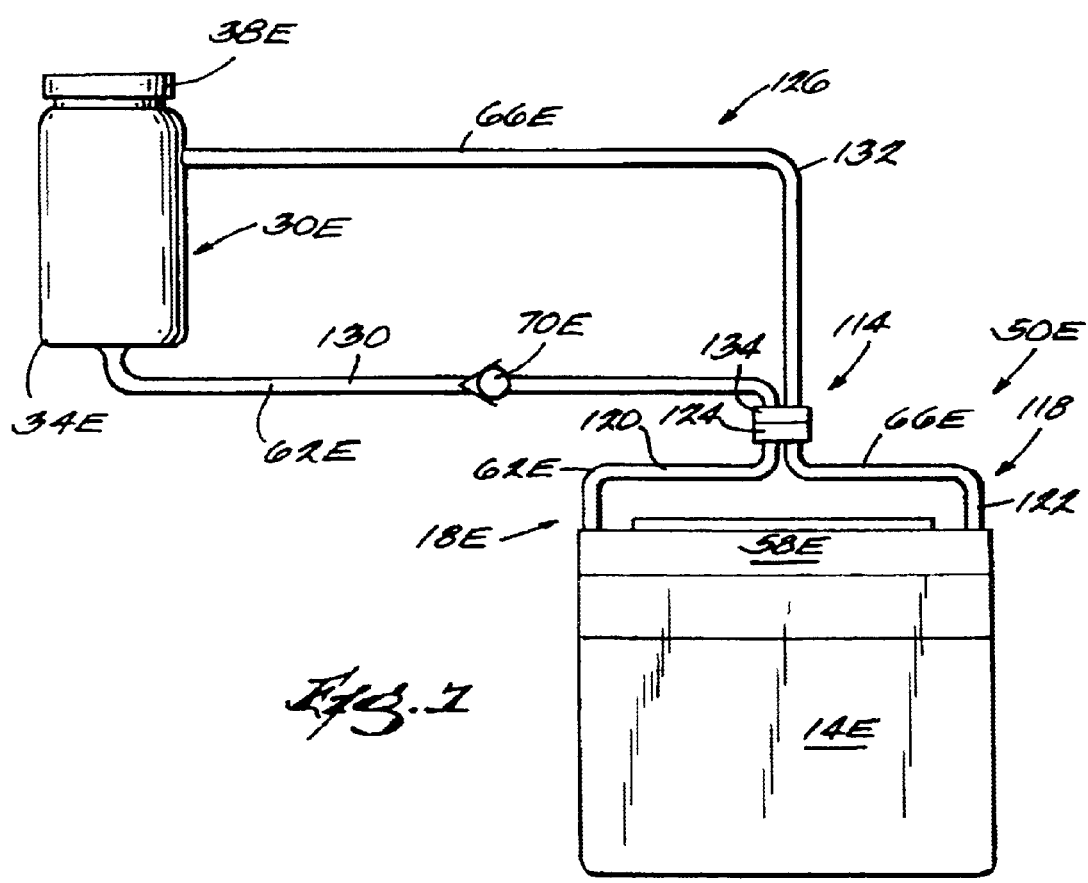
FIG. 7 is a partial schematic view of a fifth alternative construction of the fluid supply system.

A fifth alternative construction of a fluid supply system 18E is illustrated in FIG. 7. Common elements are identified by the same reference number "E".

In the construction illustrated in FIG. 7, the tank 30E is not supported on the frame (not shown but similar to the frame 20) of the vehicle (not shown but similar to the vehicle 10). The tank 30E is fluidly connectable to the remainder of the hydraulic circuit 50E by a quick-connect assembly 114. The quick-connect assembly 114 includes an on-board portion 118, including a first portion 120 of the inlet conduit 62E, a first portion 122 of the outlet conduit 66E and an on-board connector member 124 fluidly connected to the battery 14E. The quick-connect assembly 114 also includes an off-board portion 126, including a second portion 130 of the inlet conduit 62E, a second portion 132 of the outlet conduit 66E and an off-board connector member 134 fluidly connected to the tank 30E.

During replenishment, the connector members 124 and 134 are fluidly connected to fluidly connect the tank 30E to the battery 14E. Fluid is supplied through the inlet conduit 62E to replenish fluid to the battery 14E. During charging, gas pressure causes excess fluid to flow through the outlet conduit 66E and back to the tank 30E. After pressure is reduced, fluid flows through the inlet conduit 62E to again replenish the battery 14E. After replenishment, the connector members 124 and 134 are disconnected, and the vehicle is driven from the replenishment site.

Figure 8:
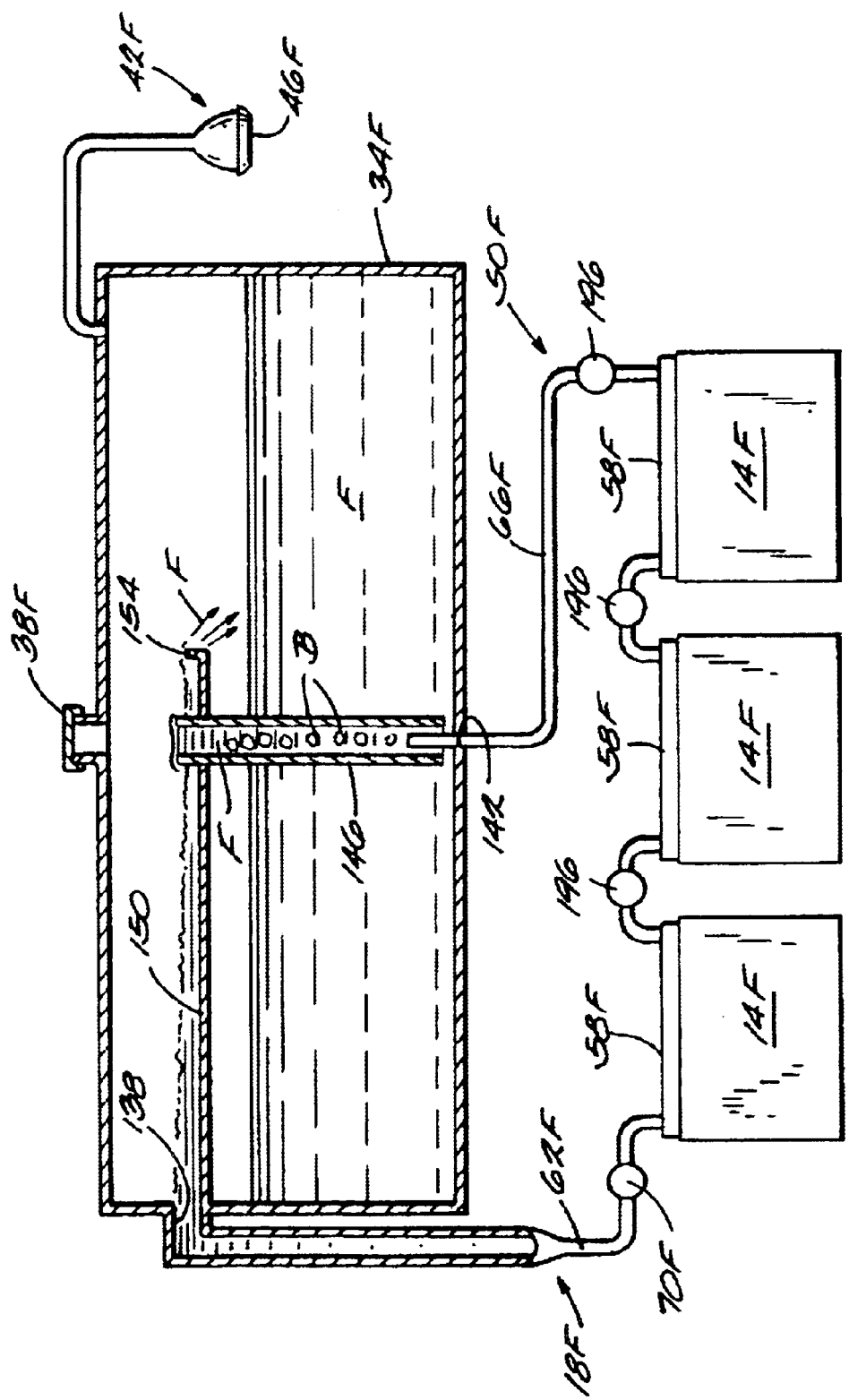
FIG. 8 is a partial schematic of a sixth alternative construction of the fluid supply system.

A sixth alternative construction of a fluid supply system 18F is illustrated in FIG. 8. Common elements are identified by the same reference number "F".

As shown in FIG. 8, the hydraulic circuit 50F connects a plurality of batteries 14F in series and in a closed loop arrangement. The tank 30F is provided by a container 34F having a tank outlet 138, connected to the inlet conduit 62F, and a tank inlet 142, positioned below the tank outlet 138 and connected to the outlet conduit 66F.

A generally vertical tube 146 is supported in the container 34F with an inlet end positioned adjacent the tank inlet 142 and spaced above the bottom wall of the container 34F. A portion of the outlet conduit 66F extends into the inlet end of the tube 146. A generally horizontal tray 150 is supported in the container 34F in communication with the tank outlet 138 and adjacent the outlet end of the tube 146. The tray 150 includes an overflow lip 154.

Initially, fluid is supplied to the tank 30F through the cap 38F. During charging, gas flows from the outlet conduit 66F and into the tube 146, causing fluid to be drawn into the inlet end of the tube 146 and to move up the tube 146 by percolation. The percolating flow in the fluid supply system 18F works in a similar manner to that of a coffee percolator. Generally, a coffee percolator includes a container with a vertical tube in the center. Liquid is heated in the percolator, and, as the liquid boils, the change in pressure in the tube (caused by the higher temperatures and the steam bubbles escaping from the heated liquid) trap the liquid between those bubbles and draw it up the tube into the tray containing the coffee grounds.

In a similar manner, percolating flow in the construction illustrated in FIG. 8 is caused by gassing of the battery 14F. As the battery 14F charges, it gases and produces a pressure differential in the fluid supply system 18F. The gas bubbles trap the excess fluid and carry the fluid up the tube 146 into the tray 150. To provide percolating flow, the diameter of the tube 146 should be less than or equal to the diameter of the gas bubbles produced during charging to ensure that the gas bubbles entering the tube 146 trap fluid between the bubbles and cause the fluid to move up the tube 146 and into the tray 150 (rather than flowing around or bypassing the fluid).

There is a preferable size range for the tube 146 so that bubbles are trapped against inside walls of the tube 146. If the tube 146 is too large, bubbles do not completely fill the tube 146 and fail to trap fluid between the bubbles, failing to circulate the fluid. For example, for a given flow of gas bubbles, in a tube at or larger than 3/8 inch inside diameter (ID), gas bubbles will not trap fluid. In a tube having a diameter equal to or less than 3/8 inch ID, bubbles may begin to trap fluid and start percolating fluid flow up the tube 146, although at a less than optimum rate. In a tube having a diameter equal to or less than 1/4 inch ID, bubbles form at a desirable rate, and the percolating fluid flow up the tube 146 becomes acceptable. A tube 146 having an ID less than 1/4 inch will work, down to a lower size limit determined by the amount of gas flow through the tube 146 required to vent the batteries 14F of charging gas. Thus, the range of tubing is less than 3/8 inch (+ or − routine size tolerance variation) down to a size required to vent battery recharging gas, with a preferred size of 1/4 inch ID.

The percolating fluid flows into the tray 150 and into the inlet conduit 62F to replenish the battery cells 16F. Excessive fluid supplied to the tray 150 overflows the lip 154 to remain in the container 34F until required for replenishment. Fluid in the tray 150 at the end of replenishment remains in the tray 150 or, if the head pressure of the fluid in the tray 150 and in the inlet conduit 62F is greater than the back pressure on the valve 70F, drains into the battery 14F.

In the illustrated construction, fluid cannot enter the outlet conduit 66F and is prevented from flowing back to the battery 14F. To prevent such back-flow, a one-way valve 156 or similar structure is provided in the outlet conduit 66F. The valve 156 prevents a reverse flow of liquid into the batteries 14F (if there is insufficient gas pressure to prevent such back-flow).

The tray 150 is positioned at a sufficient height relative to the battery 14F (and relative to the container 34F) to provide sufficient head pressure to cause the valve 70F to open (after "burping" of the fluid from the outlet conduit 66F, overcoming any remaining back pressure on the valve 70F) and to cause fluid F to flow to the battery 14F to replenish the battery cells 16F. However, the head pressure provided by the fluid in the tray 150 is limited because a significant constant head pressure on the battery cells 16F is undesirable.

The use of the elevated tray 150 enables the container 34F to be positioned at a lower height relative to the battery 14F (as compared to the above-described constructions which do not include the tray 150). The container 34F may be positioned at the same height as or lower than the battery 14F. As described above, gas produced during charging lifts fluid F to the height of the tray 150 to provide the necessary head pressure for replenishment.

Figure 9:
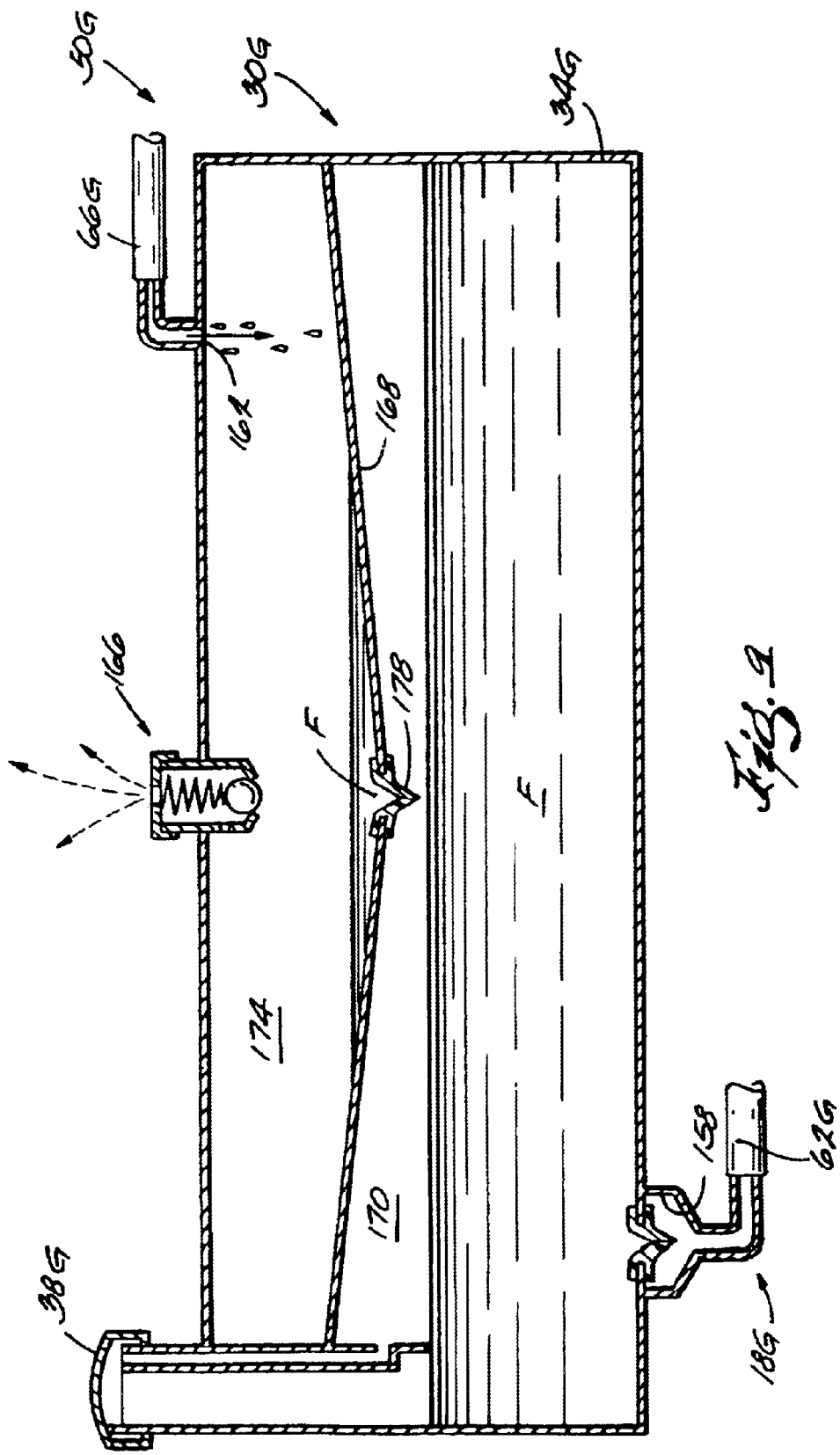
FIG. 9 is a partial cross-sectional view of a seventh alternative construction of the fluid supply system including an alternative construction for a tank for the fluid supply system.

A seventh alternative construction of a fluid supply system 18G is illustrated in FIG. 9. Common elements are identified by the same reference number "G".

As shown in FIG. 9, the tank 30G is provided by a container 34G having a tank outlet 158, connected to the inlet conduit 62G, and a tank inlet 162, connected to the outlet conduit 66G. A relief valve 166 replaces the vent (such as the vent 42) and includes a flame arrestor (not shown but similar to the flame arrestor 46). A container wall 168 divides the container 34G into a first container portion 170, which includes the tank outlet 158, and a second container portion 174, which includes the tank inlet 162 and the relief valve 166. A valve 178 controls the flow of fluid between the first and second container portions 170 and 174. A bypass orifice 180 allows gas to vent at a slow rate from the second container portion 174. The size of the bypass orifice 180 (and the flow rate of gas through the bypass orifice 180) is determined based upon the amount of gas produced during charging of the battery 14G (which is based upon the amperage used to charge the battery 14G).

Initially, fluid is filled into the first container portion 170 through the cap 38G. Fluid returned to the tank 34G (under gas pressure) flows from the second container portion 174 through the valve 178 to the first container portion 170.

Prior to charging, the pressure in the first and second container portions 170 and 174 are substantially the same. During charging, gas is produced in the hydraulic circuit 50G, causing the pressure in the first and second container portions 170 and 174 to increase to above atmospheric pressure. When the pressure in the hydraulic circuit 50G reaches a given pressure, gas is vented through the relief valve 166, reducing the pressure in the hydraulic circuit 50G.

At the end of charging, gas in the second container portion 174 slowly vents through the bypass orifice 180, reducing the pressure in the second container portion 174. The pressure differential between the first and second container portions 170 and 174 (i.e., the head pressure of the fluid in the first container portion 170 is greater than the back pressure from the second container portion 174) forces fluid flow through the hydraulic circuit 50G to replenish the battery cell (not shown).

Figure 10:
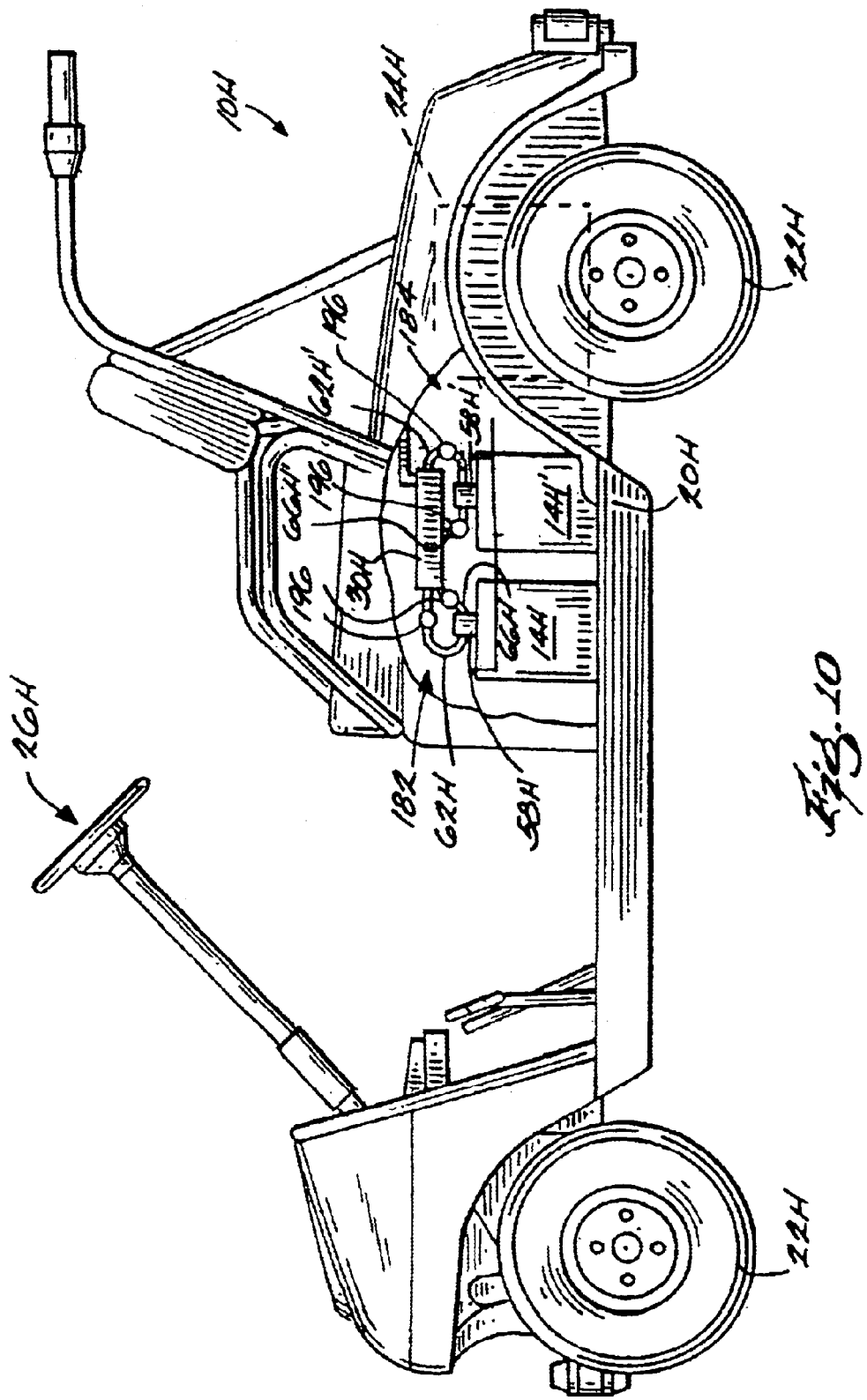
FIG. 10 is a side view of a vehicle including an eighth alternative construction of the fluid supply system.
Figure 11:
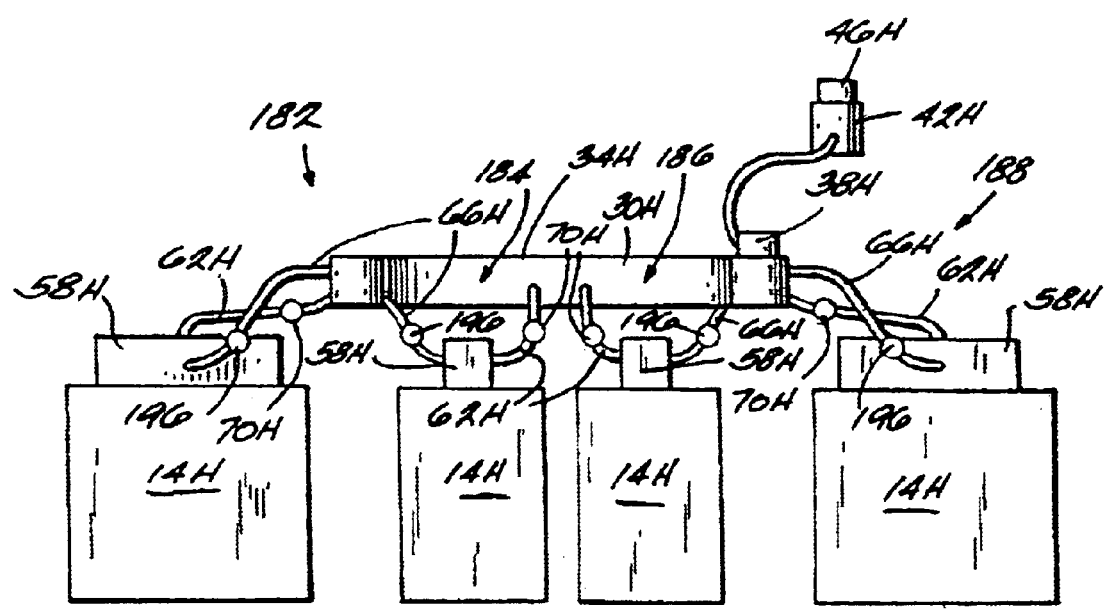
FIG. 11 is a partial schematic view of the fluid supply system shown in FIG. 10.

A vehicle 10H including an eighth alternative construction of a fluid supply system 18H is illustrated in FIGS. 10–11. Common elements are identified by the same reference number "H".

As shown in FIGS. 10–11, the hydraulic circuit 50H connects the batteries 14H to the tank 30H in separate, parallel hydraulic circuit portions 182, 184, 186 and 188. In each hydraulic circuit portion 182, 184, 186 and 188, the inlet conduit 62H is connected to the fluid supply member 54H, and the outlet conduit 66H is connected directly between the fluid supply member 54H and the tank 30H.

During fluid replenishment, fluid flows through the hydraulic circuit portions 182, 184, 186 and 188 to replenish the associated battery cells 16H. During charging, gas pressure in the hydraulic circuit portions 182, 184, 186 and 188 causes excess fluid in the associated outlet conduits 66H after replenishment to flow back to the tank 30H.

In the illustrated construction, a valve (not shown but similar to the valves 70 and 70A) is provided in each hydraulic circuit portion 182, 184, 186 and 188. After gas is vented through the vent 42H and through the flame arrestor 46H, the associated valves open, allowing fluid to flow through the hydraulic circuit portions 182, 184, 186 and 188 to replenish the associated battery cells 16H. In other constructions (not shown), a single valve may be provided to simultaneously control the flow of fluid through all of the hydraulic circuit portions 182, 184, 186 and 188.

FIG. 12 illustrates the battery 14 and the filling pod 58 in more detail. The filling pod 58 is disclosed in co-pending applications Ser. No. 09/829,766, filed Apr. 10, 2001, and Ser. No. 10/093,336, filed Mar. 7, 2002, which are hereby incorporated by reference.

In summary, the filling pod 58 includes a filling pod housing 190 having a filling pod port 192 fluidly connectable to the tank 30 for receiving fluid from the tank 30, a fluid supply member 54 fluidly connectable to the each cell 16 and for supplying fluid from the filling pod port 192 to the associated cell 16, a second filling pod port 194 fluidly connectable to the tank 30 for returning excess fluid back to the tank 30, and an integral channel (not shown in detail) in fluid communication between the first filling pod port 192, the fluid supply members 54 and the second filling pod port 194. The channel includes channel portions (not shown in detail) in fluid communication between the filling pod port 192, the fluid supply members 54 and the second filling pod port 194. The channel may connect the fluid supply members 54 in a series, parallel or combination series/parallel arrangement.

Each fluid supply member 54 may incorporate the construction of any typical pressure trap device used to supply fluid to a battery. Preferably, each fluid supply member 54 is constructed in a manner similar to the filling device illustrated in PCT Application No. WO 98-40653, published Sep. 17, 1998 and assigned to Trojan Battery Company, which is hereby incorporated by reference.

The filling pod housing 190 is preferably constructed to protect the filling pod ports 192 and 194 from being damaged. Also, the filling pod ports 192 and 194 are preferably reversibly connectable to the tank 30 so that fluid may be selectively supplied through and returned from either of the filling pod ports 192 and 194. The filling pod 58 also includes a vent arrangement (not shown in detail) for venting excessive gas from the battery cells 16 and from the filling pod 58.

In the construction illustrated in FIG. 12, the filling pod 58 is separate from the housing of the battery 14 and may be substitutable for the conventional vent caps (not shown) of the battery 14. In this construction, the battery 14 and the filling pod 58 include a cooperating locking arrangement (not shown in detail) to lock the filling pod 58 to the battery 14.

In other constructions, the filling pod 58 may be formed integrally with a portion of the battery 14, such as, for example, the battery housing or the battery cover. In yet other constructions, a filling pod (not shown) may supply fluid to more than one battery 14.

Figure 13:
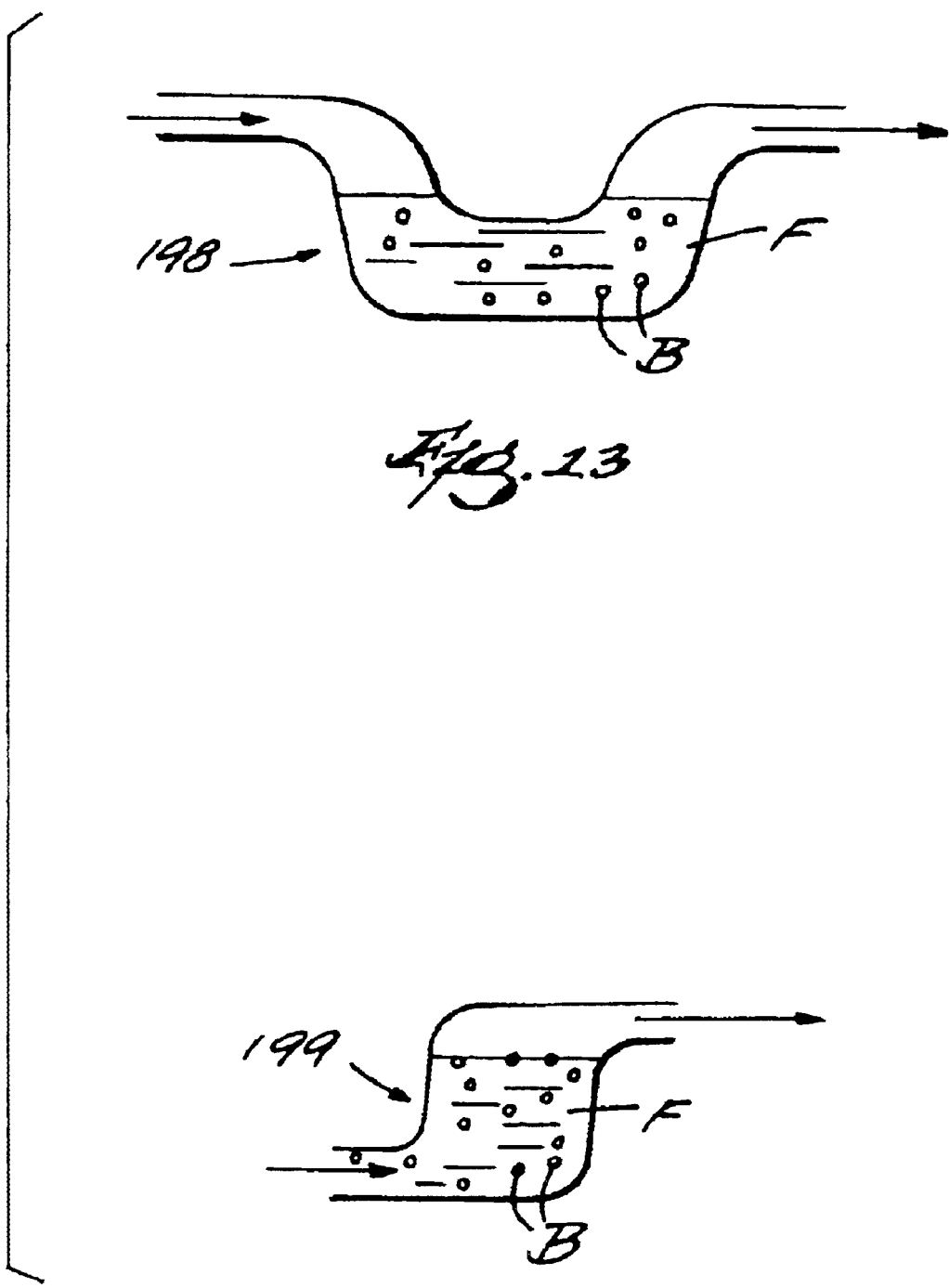
FIG. 13 are cross-sectional views of flame arrestors for use with the fluid supply system.

In the illustrated constructions (see FIGS. 1, 8 and 10–12), flame arrestors 196 are included in the conduits 62 and 66 between the tank 30 and the battery cells 16. The flame arrestors 196 may be any type of conventional flame arrestors, such as, for example, the "water quench" type flame arrestors 198 and 199 (shown in FIG. 13). In the event of arcing, the flame arrestors 196 prevent flame propagation between battery cells 16 and between the tank 30 and the battery cells 16. It should be understood that, in other constructions (not shown), one or more flame arrestors may be constructed integrally with a fluid supply member and/or integrally with a filling pod.

Figure 14:
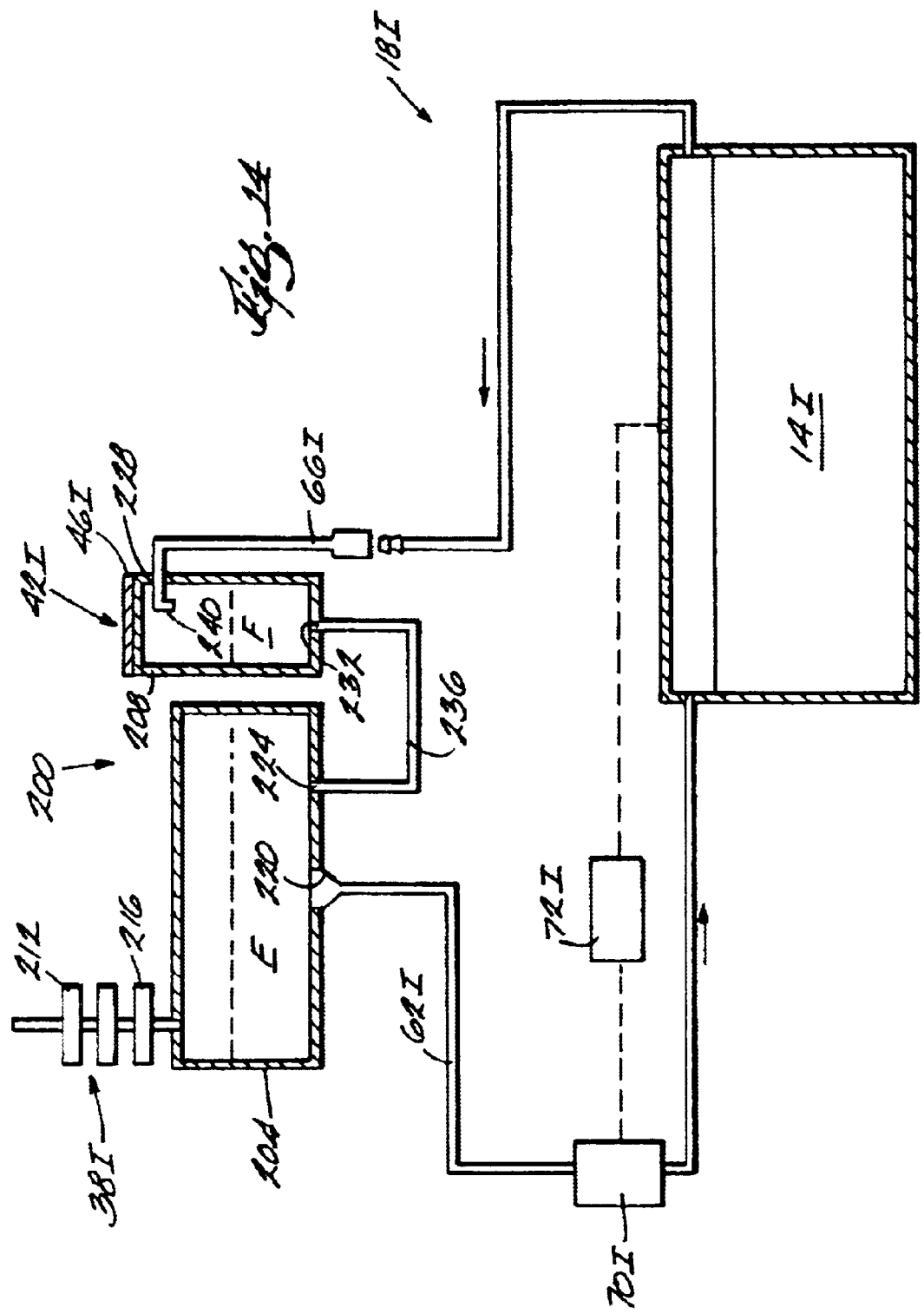
FIG. 14 is a partial schematic view of a ninth alternative construction of the fluid supply system.

A ninth alternative construction of a fluid supply system 18I is illustrated in FIG. 14. Common elements are identified by the same reference number "I."

As shown in FIG. 14, the fluid supply system 18I includes a battery gas diverting tank assembly 200. The tank assembly 200 includes a first tank 204 and a second tank 208. The first tank 204 acts as a fluid refill and supply tank for the fluid supply system 18I. The first tank 204 also includes a fill cap 38I, which allows the operator to refill the fluid in the fluid supply system 18I, when necessary. The fill cap 38I includes a vent 212 which vents pressure built-up in the first tank 204. A removable strainer portion 216 is positioned in the cap opening to strain debris from the fluid before the fluid enters the first tank 204. The first tank 204 also includes a supply outlet 220, connected to the inlet conduit 62I to supply fluid to the battery 14I, and a return passage 224.

The second tank 208 acts as a fluid return and battery gas vent tank for the fluid supply system 18I. The second tank includes a tank inlet 228, connected to the outlet conduit 66I to receive excess fluid and gas from the battery 14I. The second tank 208 includes a vent outlet 42I fitted with a flame arrestor 46I to vent gas from the fluid supply system 18I. The second tank 208 also includes a return passage 232 fluidly connected to the return passage 224 of the first tank 204 by a connecting conduit 236.

The connecting conduit 236 acts as a water trap between the tanks 204 and 208, remaining filled with fluid even when the tanks 204 and 208 are empty. Preferably, the connecting conduit 236 passes only fluid F from the second tank 208 to the first tank 204. The tanks 204 and 208 and the connecting conduit 236 act as a gas diverter because the connecting conduit 236 is positioned to remain filled with fluid to prevent the flow of gas from the second tank 208 to the first tank 204. The gas is vented only through the vent outlet 42I and is not passed to the first tank 204, because of the water trap provided by the connecting conduit 236, preventing the battery gas from being vented when the operator removes the fill cap 38I.

In operation, the first tank 204 is refilled by the operator. Under the control of the on-board computer 72I, fluid is supplied to the batteries 14I from the first tank 204 through the inlet conduit 62I. Gassing of the battery 14I moves the excess fluid through the outlet conduit 66I into the second tank 208. Gas is vented through the vent outlet 42I and does not pass to the first tank 204, and fluid is returned to the first tank 204 through the connecting conduit 236.

In the illustrated construction, gas is prevented from flowing back through the outlet conduit 66I into the battery 14I because the second supply tank 208 is preferably positioned above the battery 14I (as shown in FIG. 14). Fluid is prevented from flowing back into the battery 14I because the outlet conduit 66I is positioned above the fluid level in the second return tank 208 and because the outlet conduit 66I having a downwardly-extending spout portion 240 (as shown in FIG. 14). Thus, the fluid and gas cannot flow back through the outlet conduit 66I and into the battery 14I. In another construction (not shown), a one-way valve or similar structure may be positioned in the outlet conduit 66I to prevent such back-flow of fluid and gas.

It should be understood that the battery gas diverting tank assembly 200 may be used with any of the above-described fluid supply systems 18–18H.

Figure 15:
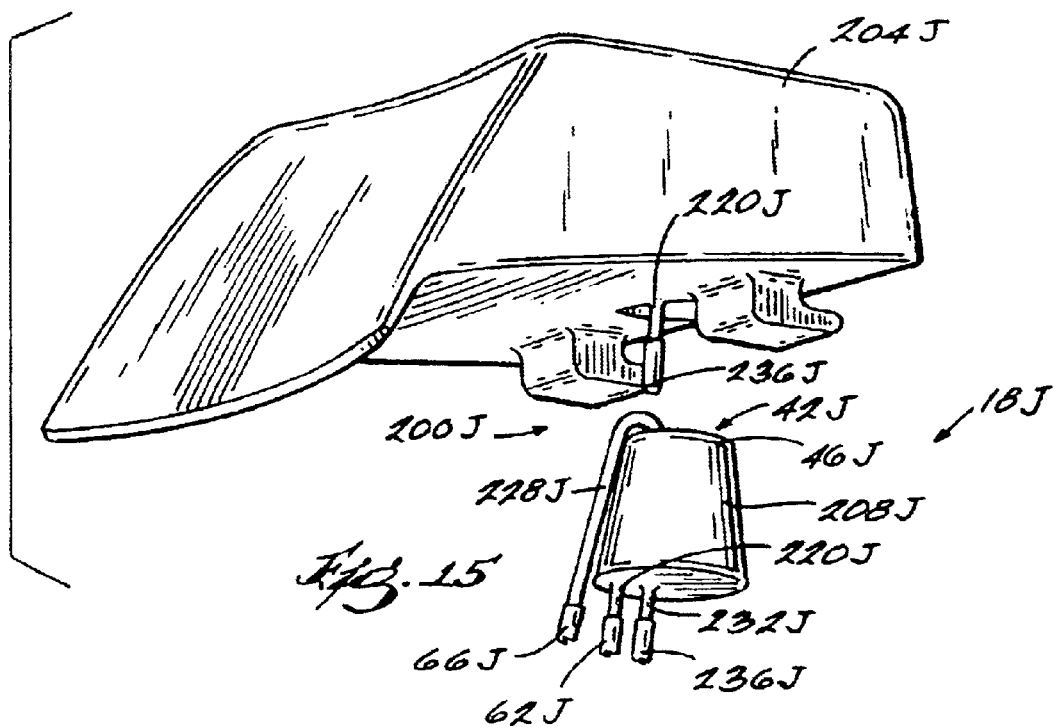
FIG. 15 is a partial schematic view of a tenth alternative construction of the fluid supply system.

A tenth alternative construction of a fluid supply system 18J is illustrated in FIG. 15. Common elements are identified by the same reference number "J."

This construction is similar to the construction illustrated in FIG. 14. However, in this construction, the first tank 204J acts as a refill tank for the fluid supply system 18J. The second tank 208J acts as a fluid supply and battery gas vent tank for the fluid supply system 18J.

In this construction, the passage 220J of the first tank 204J is connected to the passage 232J of the second tank 208J by the connecting conduit 236J to refill fluid to the second tank 208J. The connecting conduit 236J remains filled with fluid to act as a water trap and to prevent the flow of gas from the second tank 208J to the first tank 204J. The second tank 208J provides the supply outlet 220J which is connected to the inlet conduit 62J to supply fluid to the battery (not shown).

In operation, the first tank 204J is refilled by the operator, and fluid flows into the second tank 208J through the connecting conduit 236J. Under the control of the on-board computer (not shown), fluid is supplied from the second tank 208J to the batteries through the inlet conduit 62I. Gassing of the battery moves the excess fluid through the outlet conduit 66J into the second tank 208J. Gas is vented through the vent outlet 42J and, because of the water trap provided by the connecting conduit 236J, does not pass to the first tank 204J.

It should be understood that the battery gas diverting tank assembly 200J may also be used with any of the above-described fluid supply systems 18–18H.

Figure 16:
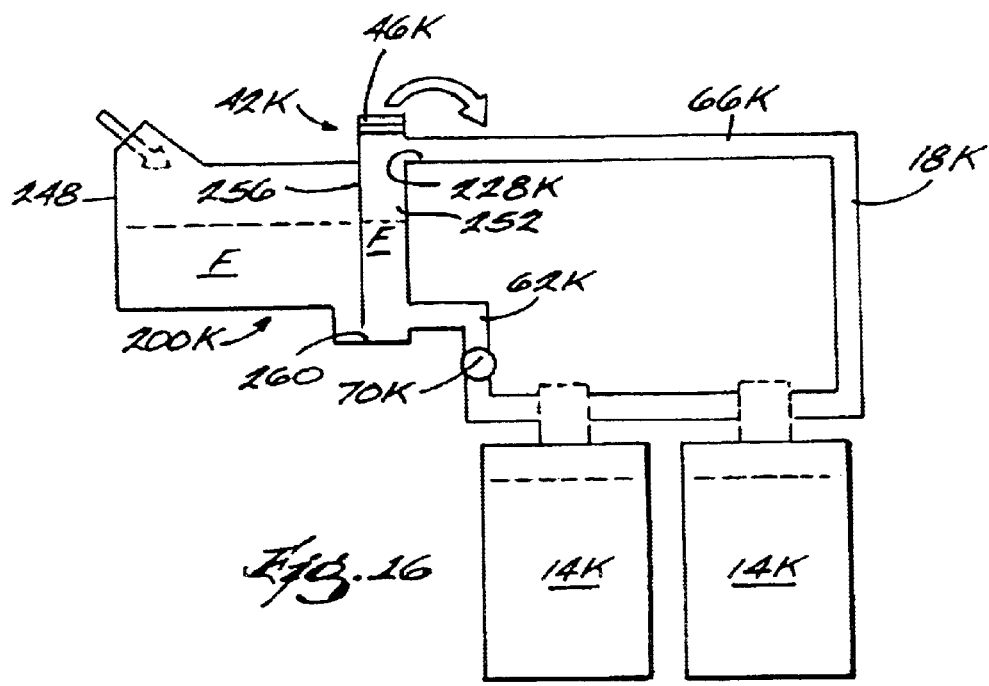
FIG. 16 is a partial schematic view of an eleventh alternative construction of the fluid supply system.
Figure 11:
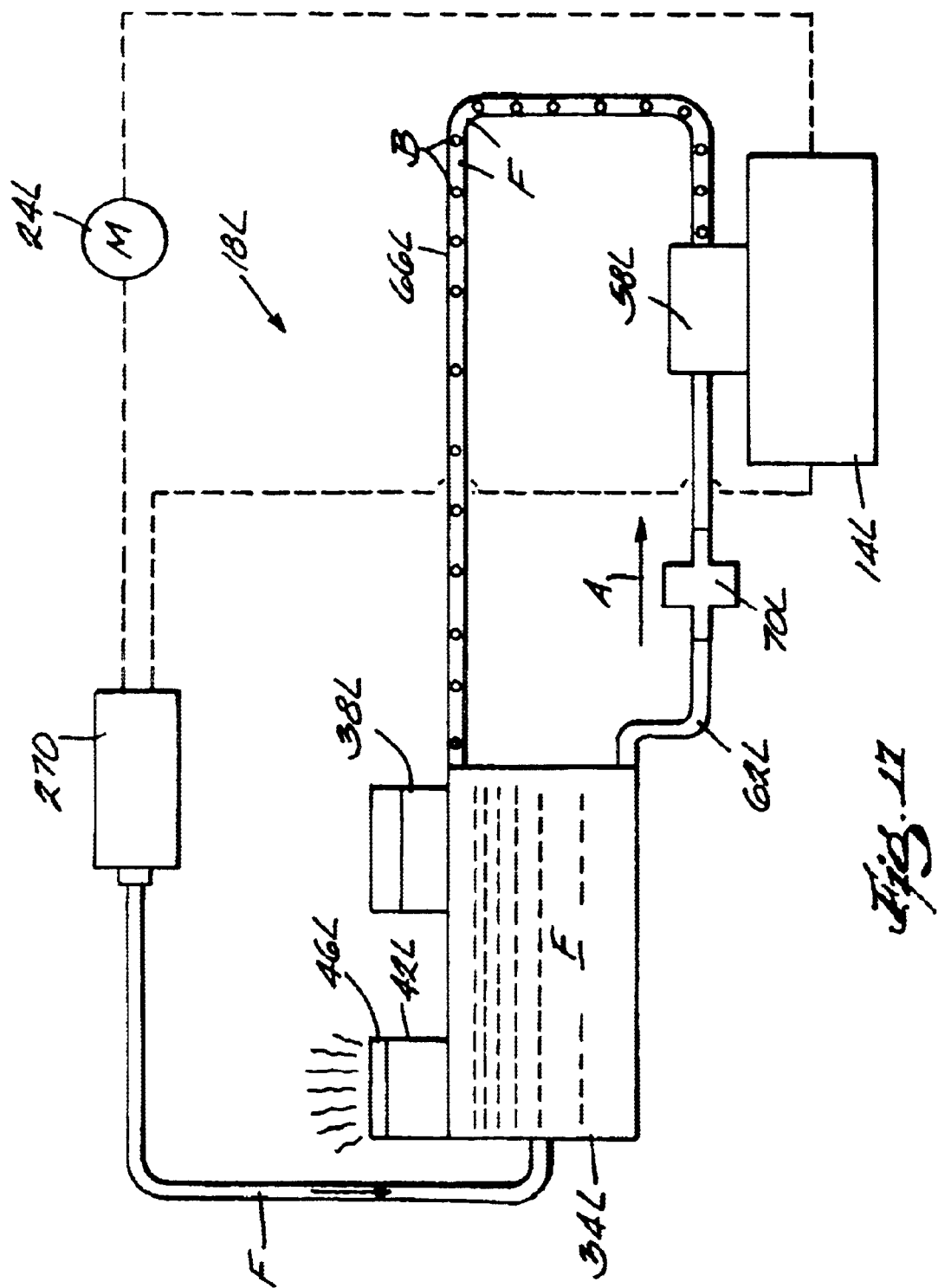

An eleventh alternative construction of a fluid supply system 18K is illustrated in FIG. 16. Common elements are identified by the same reference number "K."

As shown in FIG. 16, the tank assembly 200K is provided by a single container 244 including a first tank portion 248 and a second tank portion 252. In this construction, the first tank portion 248 acts as a fluid refill tank, and the second tank portion 252 acts as a fluid supply and battery gas vent tank.

A dividing wall 256 divides the tank portions 248 and 252. The dividing wall 256 extends downwardly from the top wall of the container 244 and is spaced from the bottom wall of the container 244 to define a connecting channel 260 between the tank portions 248 and 252. The connecting channel 260 remains filled with fluid to act as a water trap and to prevent the flow of gas from the second tank portion 252 to the first tank portion 248.

In operation, the first tank portion 248 is refilled by the operator, and fluid flows into the second tank portion 252 through the connecting channel 260. Under the control of the on-board computer (not shown), fluid is supplied from the second tank portion 252 to the batteries 14K through the inlet conduit 62K. Gassing of the batteries 14K moves the excess fluid through the outlet conduit 66K into the second tank portion 252. Gas is vented through the vent outlet 42K and, because of the water trap provided by the connecting channel 260, does not pass to the first tank portion 248.

It should be understood that the battery gas diverting tank assembly 200K may also be used with any of the above-described fluid supply systems 18–18H.

A twelfth alternative construction of a vehicle 10L and a fluid supply system 18L is illustrated in FIG. 17. Common elements are identified by the same reference number "L."

As shown in FIG. 17, the vehicle 10L includes a fuel cell 270 electrically connected to the motor 24L to selectively power the motor 24L. The battery 14L is also connected to the motor 24L to load level the power demand of the motor 24L. The fuel cell 270 is also electrically connected to the battery 14L to selectively charge the battery cells 16L.

In the illustrated construction, the fuel cell 270 is a proton exchange membrane ("PEM") fuel cell, such as that disclosed in U.S. Pat. No. 5,336,570, which issued on Aug. 9, 1994 to Dodge, Jr. and which is hereby incorporated by reference. Generally, to produce electricity with such a fuel cell 270, hydrogen gas is passed across a membrane (not shown), and air is provided on the other side of the membrane. The hydrogen gas combines with oxygen in the air, and the resulting chemical reaction produces electricity. The reaction also produces pure water as a by-product.

As shown in FIG. 17, the fuel cell 270 is fluidly connected to a tank 34L, and water produced during operation of the fuel cell 270 is collected in the tank 34L. The tank 34L is connected to a hydraulic circuit 50L including the battery 14L, and the fluid collected in the tank 34L is used to replenish the liquid electrolyte in the battery 14L. The fuel cell 270 thus provides a source of battery electrolyte (i.e., water) for replenishing the battery 14L.

The fuel cell 270 typically produces water continuously at a relatively high rate. Excess water, beyond that which may be stored in the tank 34L, overflows from the tank 34L (i.e., through the cap 38L or through the vent 42L or through a separate overflow conduit (not shown)). The overflowing water may simply flow onto the ground or may be used to cool the fuel cell 270. Alternatively, the excess water may be evaporated, for example, with heated air from the fuel cell 270.

It should be understood that the fuel cell 270 battery electrolyte replenishment fluid source may be used with any of the above-described fluid supply systems 18–18K.

It should also be understood that the fuel cell 270 battery electrolyte replenishment fluid source may also be used with a fluid supply system including a pressure source (not shown), such as a pump, or a vacuum source (not shown) for supplying fluid to the battery 14L.

Various features of the invention are set forth in the following claims.

We claim:

1. A system for supplying fluid to a battery in a vehicle selectively powered by the battery, the vehicle including a frame supporting the battery, the battery including a battery cell, fluid being transmittable to the cell, gas generated during charging of the battery being transmittable out of the cell, said system comprising:
   a tank for holding fluid; and
   a hydraulic circuit connecting the battery to the tank, the hydraulic circuit including
      an inlet conduit connectable between the tank and the cell, and
      an outlet conduit connectable between the cell and the tank, gas produced during charging causing fluid flow through the outlet conduit and to the tank.

2. The system as set forth in claim 1 wherein the outlet conduit collects gas transmitted from the cell in the form of gas bubbles with fluid entrapped between the bubbles, and whereby the bubbles flow to the tank due to pressure build up in the battery causing flow of fluid through the hydraulic circuit during charging.

3. The system as set forth in claim 1 wherein the hydraulic circuit further includes a fluid supply member connectable to the cell and for supplying fluid to the cell, the inlet conduit being connectable between the tank and the fluid supply member, the outlet conduit being connectable between the fluid supply member and the tank.

4. The system as set forth in claim 3 wherein the battery includes a second battery cell, and wherein the hydraulic circuit further includes a second fluid supply member connectable to the second cell and for supplying fluid to the second cell, the inlet conduit being connectable between the tank and the second fluid supply member, the outlet conduit being connectable between the second fluid supply member and the tank.

5. The system as set forth in claim 4 and further comprising a filling pod connectable to the battery, the filling pod including the first-mentioned fluid supply member and the second fluid supply member.

6. The system as set forth in claim 1 wherein the vehicle is powered by a first battery and a second battery, the first battery including a first battery cell, the second battery including a second battery cell, fluid being transmittable to the first battery cell and to the second battery cell, gas generated during charging being transmittable out of the first battery cell and out of the second battery cell, and wherein the hydraulic circuit includes
   a first inlet conduit connectable between the tank and the first battery cell,
   a first outlet conduit connectable between the first battery cell and the tank, gas produced during charging causing fluid flow through the first outlet conduit and to the tank,
   a second inlet conduit connectable between the tank and the second battery cell, and
   a second outlet conduit connectable between the second battery cell and the tank, gas produced during charging causing fluid flow through the second outlet conduit and to the tank.

7. The system as set forth in claim 6 wherein the hydraulic circuit has a first hydraulic circuit portion including the first inlet conduit and the first outlet conduit and a second hydraulic circuit portion including the second inlet conduit and the second outlet conduit, the first hydraulic circuit portion and the second hydraulic circuit portion providing separate, parallel hydraulic circuit portions.

8. The system as set forth in claim 6 wherein the hydraulic circuit has a first hydraulic circuit portion including the first inlet conduit and the first outlet conduit and a second hydraulic circuit portion including the second inlet conduit and the second outlet conduit, the tank, the first hydraulic circuit portion and the second hydraulic circuit portion being arranged in series.

9. The system as set forth in claim 1 wherein the outlet conduit has an internal diameter of less than $3/8$ inch.

10. The system as set forth in claim 1 wherein the outlet conduit has an internal diameter of about $1/4$ inch.

11. The system as set forth in claim 1 wherein the inlet conduit includes a one-way flow control valve for permitting fluid flow in the inlet conduit in a direction only from the tank to the cell.

12. The system as set forth in claim 1 and further comprising a valve for controlling flow through the inlet conduit.

13. The system as set forth in claim 12 wherein the valve is a check valve.

14. The system as set forth in claim 12 wherein the valve is an electronic valve.

15. The system as set forth in claim 12 wherein the valve is a mechanical valve.

16. The system as set forth in claim 1 and further comprising an overflow tank having an overflow inlet for receiving fluid from the cell and an overflow outlet, the outlet conduit being connected between the overflow outlet and the first-mentioned tank, wherein the hydraulic circuit further includes an overflow conduit connected between the cell and the overflow tank.

17. The system as set forth in claim 16 wherein the overflow tank collects excess fluid supplied to the cell during fluid replenishment of the cell.

18. The system as set forth in claim 17 wherein the overflow tank collects gas produced during charging, the gas causing flow of fluid from the overflow tank to the first-mentioned tank.

19. The system as set forth in claim 18 wherein, after charging, the overflow tank collects excess fluid supplied to the cell during fluid replenishment of the cell.

20. The system as set forth in claim 16 wherein the overflow tank has a first overflow outlet and a second overflow outlet.

21. The system as set forth in claim 20 wherein the first overflow outlet is positioned below the second overflow outlet.

22. The system as set forth in claim 20 wherein the first overflow outlet is configured to pass fluid and gas bubbles.

23. The system as set forth in claim 22 wherein the second overflow outlet is configured to pass only gas bubbles.

24. The system as set forth in claim 20 wherein the second overflow outlet is configured to pass gas bubbles from the battery thereby allowing fluid into the cell.

25. The system as set forth in claim 24 wherein, during charging, the second overflow outlet is configured to pass a first amount of gas bubbles and to retain a second amount of gas bubbles in the overflow tank.

26. The system as set forth in claim 25 wherein the second amount of gas bubbles causes flow of fluid from the first overflow outlet, through the outlet conduit and to the first-mentioned tank.

27. The system as set forth in claim 20 wherein the hydraulic circuit includes a vent conduit connectable to the second overflow outlet and through which gas is vented.

28. The system as set forth in claim 27 and further comprising a vent valve for controlling flow through the vent conduit, the vent valve having an open position, in which gas is vented through the vent conduit, and a closed position, in which flow through the vent conduit is prevented.

29. The system as set forth in claim 28 and further comprising an inlet valve for controlling flow through the inlet conduit, the inlet valve having an open position, in which fluid flows from the tank and through the inlet conduit, and a closed position, in which flow through the inlet conduit is prevented.

30. The system as set forth in claim 29 and further comprising a valve assembly including the vent valve and the inlet valve, the valve assembly having an open condition, in which flow through the vent conduit and through the inlet conduit is permitted, and a closed condition, in which flow through the vent conduit and through the inlet conduit is prevented.

31. The system as set forth in claim 30 wherein, in the open condition, the valve assembly allows fluid flow through the inlet conduit and into the cell and allows gas to be vented from the cell through the vent conduit, and wherein, in the closed condition, the overflow tank collects gas produced during charging, the gas causing fluid to move from the overflow tank to the first-mentioned tank.

32. The system as set forth in claim 30 wherein the valve assembly is responsive to a charger assembly for charging the battery, the valve assembly moving to the closed condition when the charger assembly is placed in a charging condition, in which the battery is charged.

33. The system as set forth in claim 1 wherein the tank is supported at an elevation above the battery to provide sufficient head pressure by gravity to overcome any pressure loss across the inlet conduit, the battery and the outlet conduit.

34. The system as set forth in claim 1 wherein the tank includes
a container for holding fluid and defining a tank outlet and a tank inlet, the tank inlet being below the tank outlet, the tank outlet being connected with the inlet conduit, the tank inlet being connected with the outlet conduit, the container having a bottom wall,
a tube having an inlet end positioned adjacent the tank inlet and an outlet end positioned above the inlet end, the inlet end being spaced above the bottom wall, a portion of the outlet conduit extending into the inlet end, and
a tray supported adjacent the outlet end of the tube and communicating with the tank outlet,
wherein gas produced during charging flows from the outlet conduit into the tube, causing fluid to move from the tube into the tray, and wherein fluid in the tray flows into the inlet conduit.

35. The system as set forth in claim 1 wherein the tank includes a container for holding fluid and defining a tank outlet, a vent outlet, and a tank inlet, the tank outlet being connected to the inlet conduit, the tank inlet being connected with the outlet conduit, the container including a container wall to provide a first container portion and a second container portion, the tank outlet being in the first container portion, the tank inlet and the vent outlet being in the second container portion, wherein, initially, a first container portion pressure and a second container pressure are substantially equal, and wherein, thereafter, gas is vented from the second container portion causing a pressure differential of the second container portion pressure being less than the first container portion, the pressure differential causing fluid flow from the first container portion, through the hydraulic circuit and to the second container portion.

36. The system as set forth in claim 1 wherein the tank includes a first container portion defining a fill inlet for receiving fluid into the system, and a second container portion in fluid communication with the first container portion and defining a return inlet connected to the outlet conduit such that fluid and gas flow into the second container portion, the second container portion also defining a vent outlet operable to allow gas to vent from the system, one of the first container portion and the second container portion including a fluid supply outlet connected to the inlet conduit to supply fluid to the battery.

37. The system of claim 36 wherein the first container portion and the second container portion are provided by a separate first container and a second container, respectively.

38. The system of claim 37 wherein the first container portion and the second container portion are connected by a connection conduit.

39. The system of claim 36 wherein the first container portion provides the supply outlet connected to the inlet conduit to supply fluid to the battery.

40. The system of claim 36 wherein the second container portion provides the supply outlet connected to the inlet conduit to supply fluid to the battery.

41. The system of claim 36 wherein the first container portion and the second container portion are provided by a single container.

42. The system of claim 39 wherein the tank includes a top wall and a bottom wall, and wherein the first container portion and the second container portion are divided by a dividing wall extending downwardly from the top wall, the dividing wall being spaced from the bottom wall to allow fluid to pass between the first container portion and the second container portion.

43. A system for supplying fluid to a battery in a vehicle selectively powered by a first battery and a second battery, the vehicle including a frame supporting the first battery and the second battery, the first battery including a first battery cell, fluid being transmittable to the first battery cell, gas generated during charging of the first battery being transmittable out of the first battery cell, the second battery including a second battery cell, fluid being transmittable to the second battery cell, gas generated during charging of the second battery being transmittable out of the second battery cell, said system comprising:
 a tank for holding fluid; and
 a hydraulic circuit connecting the first battery and the second battery to the tank, the hydraulic circuit including
  a first inlet conduit between the tank and the first battery cell,
  a first outlet conduit between the first battery cell and the tank, gas produced during charging causing fluid flow through the first outlet conduit and to the tank,
  a second inlet conduit between the tank and the second battery cell, and
  a second outlet conduit between the second battery cell and the tank, gas produced during charging causing fluid flow through the second outlet conduit and to the tank.

44. The system as set forth in claim 43 wherein the first outlet conduit collects gas transmitted from the first battery cell in the form of gas bubbles with fluid entrapped between the bubbles, and whereby the bubbles flow to the tank due to pressure build up in the first battery causing flow of fluid through the hydraulic circuit during charging, and wherein the second outlet conduit collects gas transmitted from the second battery cell in the form of gas bubbles with fluid entrapped between the bubbles, and whereby the bubbles flow to the tank due to pressure build up in the second battery causing flow of fluid through the hydraulic circuit during charging.

45. The system as set forth in claim 43 wherein the hydraulic circuit has a first hydraulic circuit portion including the first inlet conduit and the first outlet conduit and a second hydraulic circuit portion including the second inlet conduit and the second outlet conduit, the first hydraulic circuit portion and the second hydraulic circuit portion providing separate, parallel hydraulic circuit portions.

46. The system as set forth in claim 43 wherein the hydraulic circuit has a first hydraulic circuit portion including the first inlet conduit and the first outlet conduit and a second hydraulic circuit portion including the second inlet conduit and the second outlet conduit, the tank, the first hydraulic circuit portion and the second hydraulic circuit portion being arranged in series.

47. The system as set forth in claim 43 wherein the first inlet conduit is connected to the first cell, wherein the second inlet conduit provides the first outlet conduit and is connected between the first cell and the second cell, and wherein the second outlet conduit is connected between the second cell and the tank.

48. The system as set forth in claim 43 wherein the hydraulic circuit includes a first fluid supply member connectable to the first battery cell, the first fluid supply member having a first inlet and a first outlet, wherein the hydraulic circuit includes a second fluid supply member connectable to the second battery cell, the second fluid supply member having a second inlet and a second outlet, and wherein the first inlet conduit is connected between the tank and the first inlet, the second inlet conduit provides the first outlet conduit and is connected between the first outlet and the second inlet, and the second outlet conduit is connected between the second outlet and the tank.

49. A system for supplying fluid to a battery in a vehicle selectively powered by the battery, the vehicle including a frame supporting the battery, the battery including a battery cell, fluid being transmittable to the cell, gas generated during charging being transmittable out of the cell, said system comprising:
 a first tank for holding fluid;
 a second tank for holding fluid; and
 a hydraulic circuit connecting the battery to the first tank and to the second tank, the hydraulic circuit including
  a first conduit connectable between the first tank and the cell,
  a second conduit connectable between the cell and the second tank, and
  a third conduit connectable between the second tank and the first tank;
 wherein the second tank collects excess fluid supplied to the cell during fluid replenishment of the cell, and wherein the second tank collects gas produced during charging, the gas causing fluid to move from the second tank to the first tank.

50. The system as set forth in claim 49 wherein gas is transmitted through the third conduit in the form of gas bubbles with fluid entrapped between the bubbles, and whereby the bubbles flow to the first tank due to pressure build up in the second tank causing flow of fluid through the hydraulic circuit during charging.

51. The system as set forth in claim 49 wherein, after charging, the second tank collects excess fluid supplied to the cell during fluid replenishment of the cell.

52. The system as set forth in claim 49 wherein the overflow tank has a first overflow outlet and a second overflow outlet.

53. The system as set forth in claim 52 wherein the first overflow outlet has an internal diameter greater than an internal diameter of the second overflow outlet.

54. The system as set forth in claim 52 wherein the outlet conduit has an internal diameter, and wherein the second overflow outlet has an internal diameter less than the internal diameter of the outlet conduit.

55. The system as set forth in claim 52 wherein the first overflow outlet is positioned below the second overflow outlet.

56. The system as set forth in claim 52 wherein the first overflow outlet is configured to pass fluid and gas bubbles.

57. The system as set forth in claim 56 wherein the second overflow outlet is configured to pass only gas bubbles.

58. The system as set forth in claim 52 wherein the first overflow outlet and the second overflow outlet are connected to the outlet conduit.

59. The system as set forth in claim 52 wherein the second overflow outlet is configured to pass gas bubbles from the battery thereby allowing fluid into the cell.

60. The system as set forth in claim 59 wherein, during charging, the second overflow outlet is configured to pass a first amount of gas bubbles and to retain a second amount of gas bubbles in the overflow tank.

61. The system as set forth in claim 60 wherein the second amount of gas bubbles causes flow of fluid from the first overflow outlet, through the outlet conduit and to the first tank.

62. The system as set forth in claim 52 wherein the hydraulic circuit includes a vent conduit connectable to the second overflow outlet and through which gas is vented.

63. The system as set forth in claim 62 and further comprising a vent valve for controlling flow through the vent conduit, the vent valve having an open position, in which gas is vented through the vent conduit, and a closed position, in which flow through the vent conduit is prevented.

64. The system as set forth in claim 63 and further comprising an inlet valve for controlling flow through the inlet conduit, the inlet valve having an open position, in which fluid flows from the tank and through the inlet conduit, and a closed position, in which flow through the inlet conduit is prevented.

65. The system as set forth in claim 64 and further comprising a valve assembly including the vent valve and the inlet valve, the valve assembly having an open condition, in which flow through the vent conduit and through the inlet conduit is permitted, and a closed condition, in which flow through the vent conduit and through the inlet conduit is prevented.

66. The system as set forth in claim 65 wherein the valve assembly is an electronic valve assembly.

67. The system as set forth in claim 65 wherein the valve assembly is a mechanical valve assembly.

68. The system as set forth in claim 65 wherein, in the open condition, the valve assembly allows fluid flow through the inlet conduit and into the cell and allows gas to be vented from the cell through the vent conduit, and wherein, in the closed condition, the overflow tank collects gas produced during charging, the gas causing fluid to move from the overflow tank to the first tank.

69. The system as set forth in claim 65 wherein the valve assembly is responsive to a charger assembly for charging the battery, the valve assembly moving to the closed condition when the charger assembly is placed in a charging condition, in which the battery is charged.

70. A vehicle comprising:
a frame supported for movement over ground;
an electric motor supported by the frame and operable to selectively drive said vehicle;
a battery supported by the frame and electrically connectable with the motor to selectively power the motor, the battery including a battery cell, fluid being transmittable to the cell, gas generated during charging of the battery being transmittable out of the cell;
a tank for holding fluid; and
a hydraulic circuit connecting the battery to the tank, the hydraulic circuit including
an inlet conduit connectable between the tank and the cell, and
an outlet conduit connectable between the cell and the tank, gas produced during charging causing fluid flow through the outlet conduit and to the tank.

71. The vehicle as set forth in claim 70 and further comprising a second battery supported by the frame and electrically connectable with the motor to selectively power the motor, the second battery including a second battery cell, fluid being transmittable to the second battery cell, gas generated during charging being transmittable out of the second battery cell, and wherein the hydraulic circuit further includes
a second inlet conduit between the tank and the second battery cell, and
a second outlet conduit between the second battery cell and the tank, gas produced during charging causing fluid flow through the second outlet conduit and to the tank.

72. The vehicle as set forth in claim 71 wherein the hydraulic circuit has a first hydraulic circuit portion including the first-mentioned inlet conduit and the first-mentioned outlet conduit and a second hydraulic circuit portion including the second inlet conduit and the second outlet conduit, the first hydraulic circuit portion and the second hydraulic circuit portion providing separate, parallel hydraulic circuit portions.

73. The vehicle as set forth in claim 71 wherein the hydraulic circuit has a first hydraulic circuit portion including the first-mentioned inlet conduit and the first-mentioned outlet conduit and a second hydraulic circuit portion including the second inlet conduit and the second outlet conduit, the tank, the first hydraulic circuit portion and the second hydraulic circuit portion being arranged in series.

74. The vehicle as set forth in claim 70 and further comprising an overflow tank having an overflow inlet for receiving fluid from the cell and an overflow outlet, the outlet conduit being connected between the overflow outlet and the first-mentioned tank, wherein the hydraulic circuit further includes an overflow conduit connected between the cell and the overflow tank.

75. The vehicle as set forth in claim 74 wherein the overflow tank collects excess fluid supplied to the cell during fluid replenishment of the cell.

76. The vehicle as set forth in claim 75 wherein the overflow tank collects gas produced during charging, the gas causing flow of fluid from the overflow tank to the first-mentioned tank.

77. The vehicle as set forth in claim 76 wherein, after charging, the overflow tank collects excess fluid supplied to the cell during fluid replenishment of the cell.

78. The vehicle as set forth in claim 74 wherein the overflow tank in supported on the frame.

79. The vehicle as set forth in claim 70 wherein the tank is supported on the frame.

80. A vehicle comprising:
a frame supported for movement over ground;
an electric motor supported by the frame and operable to selectively drive said vehicle;
a first battery and a second battery supported by the frame and electrically connectable with the motor to selectively power the motor, the first battery including a first battery cell, the second battery including a second battery cell, fluid being transmittable to the first battery cell and to the second battery cell, gas generated during charging being transmittable out of the first battery cell and out of the second battery cell;
a tank for holding fluid; and
a hydraulic circuit connecting the first battery and the second battery to the tank, the hydraulic circuit including
a first inlet conduit connectable between the tank and the first battery cell,
a first outlet conduit connectable between the first battery cell and the tank, gas produced during charging causing fluid flow through the first outlet conduit and to the tank, a second inlet conduit connectable between the tank and the second battery cell, and a second outlet conduit connectable between the second battery cell and the tank, gas produced during charging causing fluid flow through the second outlet conduit and to the tank.

81. The vehicle as set forth in claim 80 wherein the hydraulic circuit has a first hydraulic circuit portion including the first inlet conduit and the first outlet conduit and a second hydraulic circuit portion including the second inlet conduit and the second outlet conduit, the first hydraulic circuit portion and the second hydraulic circuit portion providing separate, parallel hydraulic circuit portions.

82. The vehicle as set forth in claim 80 wherein the hydraulic circuit has a first hydraulic circuit portion including the first inlet conduit and the first outlet conduit and a second hydraulic circuit portion including the second inlet conduit and the second outlet conduit, the tank, the first hydraulic circuit portion and the second hydraulic circuit portion being arranged in series.

83. A vehicle comprising:
a frame supported for movement over ground;
an electric motor supported by the frame and operable to selectively drive said vehicle;
a battery supported by the frame and electrically connectable with the motor to selectively power the motor, the battery including a battery cell, fluid being transmittable to the cell, gas generated during charging being transmittable out of the first cell;
a first tank for holding fluid;
a second tank for holding fluid; and
a hydraulic circuit connecting the battery to the first tank and to the second tank, the hydraulic circuit including
a first conduit connectable between the first tank and the cell,
a second conduit connectable between the cell and the second tank, and
a third conduit connectable between the second tank and the first tank;
wherein the second tank collects excess fluid supplied to the cell during fluid replenishment of the cell, and wherein the second tank collects gas produced during charging, the gas causing fluid to move from the second tank to the first tank.

84. The vehicle as set forth in claim 83 wherein gas is transmitted through the third conduit in the form of gas bubbles with fluid entrapped between the bubbles, and whereby the bubbles flow to the first tank due to pressure build up in the second tank causing flow of fluid through the hydraulic circuit during charging.

85. The vehicle as set forth in claim 83 wherein, after charging, the second tank collects excess fluid supplied to the cell during fluid replenishment of the cell.

86. The vehicle as set forth in claim 83 wherein the first tank and the second tank are supported by the frame.

87. A tank for holding fluid in a fluid supply system, the fluid supply system supplying fluid to a battery in a vehicle selectively powered by the battery, the vehicle including a frame supporting the battery, the battery including a battery cell, fluid being transmittable to the cell, gas generated during charging being transmittable out of the cell, the fluid supply system including a hydraulic circuit, the hydraulic circuit including an inlet conduit connected to the cell and an outlet conduit connected to the cell, said tank comprising:
a container for holding fluid and defining a tank outlet and a tank inlet, the tank inlet being below the tank outlet, the tank outlet being connected with the inlet conduit, the tank inlet being connected with the outlet conduit, the container having a bottom wall,
a tube having an inlet end positioned adjacent the tank inlet and an outlet end positioned above the inlet end, the inlet end being spaced above the bottom wall, a portion of the outlet conduit extending into the inlet end, and
a tray supported adjacent the outlet end of the tube and communicating with the tank outlet,
wherein gas produced during charging of the battery flows from the outlet conduit into the tube, causing fluid to move from the tube into the tray, and wherein fluid in the tray flows into the inlet conduit.

88. A tank for holding fluid in a fluid supply system, the fluid supply system supplying fluid to a battery in a vehicle selectively powered by the battery, the vehicle including a frame supporting the battery, the battery including a battery cell, fluid being transmittable to the cell, gas generated during charging being transmittable out of the cell, the fluid supply system including a hydraulic circuit, the hydraulic circuit including an inlet conduit connected to the cell and an outlet conduit connected to the cell, said tank comprising:
a container for holding fluid and defining a tank outlet, a vent outlet, and a tank inlet, the tank outlet being connected to the inlet conduit, the tank inlet being connected with the outlet conduit, the container including a container wall to provide a first container portion and a second container portion, the tank outlet being in the first container portion, the tank inlet and the vent outlet being in the second container portion, wherein, initially, a first container portion pressure and a second container pressure are substantially equal, and wherein, thereafter, gas produced during charging of the battery is vented from the second container portion causing a pressure differential of the second container portion pressure being less than the first container portion, the pressure differential causing fluid flow from the first container portion, through the hydraulic circuit and to the second container portion.

89. A tank for holding fluid in a fluid supply system, the fluid supply system supplying fluid to a battery in a vehicle selectively powered by the battery, the vehicle including a frame supporting the battery, the battery including a battery cell, fluid being transmittable to the cell, gas generated during charging being transmittable out of the cell, the fluid supply system including a hydraulic circuit, the hydraulic circuit including an inlet conduit connected to the cell and an outlet conduit connected to the cell, said tank comprising:
a first container portion defining a fill inlet for receiving fluid into the system; and
a second container portion in fluid communication with the first container portion and defining a return inlet connected to the outlet conduit such that fluid and gas flow into the second container portion, the second container portion also defining a vent outlet operable to allow gas to vent from the system, one of the first container portion and the second container portion including a fluid supply outlet connected to the inlet conduit to supply fluid to the battery.

90. The tank of claim 89 wherein the first container portion and the second container portion are provided by a separate first container and a second container, respectively.

91. The tank of claim 90 wherein the first container and the second container are connected by a connection conduit.

92. The tank of claim 89 wherein the first container portion provides the supply outlet connected to the inlet conduit.

93. The tank of claim 89 wherein the second container portion provides the supply outlet connected to the inlet conduit.

94. The tank of claim 89 wherein the first container portion and the second container portion are provided by a single container.

95. The tank of claim 94 wherein the tank includes a top wall and a bottom wall, and wherein the first container portion and the second container portion are divided by a dividing wall extending downwardly from the top wall, the dividing wall being spaced from the bottom wall to allow fluid to pass between the first container portion and the second container portion.

96. A method for supplying fluid to a battery in a vehicle selectively powered by the battery, the vehicle including a frame supporting the battery, the battery including a battery cell, fluid being transmittable to the cell, gas generated during charging of the battery being transmittable out of the cell, said method comprising the acts of:

providing a system for supplying fluid to the battery, the system including a tank for holding fluid, and a hydraulic circuit connecting the battery to the tank, the hydraulic circuit including an inlet conduit connectable between the tank and the cell, and an outlet conduit connectable between the cell and the tank;

supplying fluid to the tank;

allowing fluid flow from the tank through the inlet conduit to the cell;

charging the battery, the charging act including producing gas; and causing flow of fluid through the outlet conduit and to the tank, the causing act including using gas produced during the charging act to cause fluid flow through the outlet conduit and to the tank.

97. A method for supplying fluid to a battery in a vehicle selectively powered by a first battery and a second battery, the vehicle including a frame supporting the first battery and the second battery, the first battery including a first battery cell, fluid being transmittable to the first battery cell, gas generated during charging of the first battery being transmittable out of the first battery cell, the second battery including a second battery cell, fluid being transmittable to the second battery cell, gas generated during charging of the second battery being transmittable out of the second battery cell, said method comprising the acts of:

providing a system for supplying fluid to the battery, the system including a tank for holding fluid, and a hydraulic circuit connecting the battery to the tank, the hydraulic circuit including a first inlet conduit connectable between the tank and the first battery cell, a first outlet conduit connectable between the first battery cell and the tank, a second inlet conduit connectable between the tank and the second battery cell, and a second outlet conduit connectable between the second battery cell and the tank;

supplying fluid to the tank;

allowing fluid flow from the tank through the first inlet conduit to the first battery cell;

allowing fluid flow from the tank through the second inlet conduit to the second battery cell;

charging the first battery and the second battery, the charging act including producing gas; and causing flow of fluid through the first outlet conduit and to the tank and through the second outlet conduit and to the tank, the causing act including using gas produced during the charging act to cause fluid flow through the first outlet conduit and to the tank and through the second outlet conduit and to the tank.

98. A method for supplying fluid to a battery in a vehicle selectively powered by the battery, the vehicle including a frame supporting the battery, the battery including a battery cell, fluid being transmittable to the cell, gas generated during charging of the battery being transmittable out of the cell, said method comprising the acts of:

providing a system for supplying fluid to the battery, the system including a first tank for holding fluid, a second tank for holding fluid, and a hydraulic circuit connecting the battery to the first tank and to the second tank, the hydraulic circuit including a first conduit connectable between the first tank and the cell, a second conduit connectable between the cell and the second tank, and a third conduit connectable between the second tank and the first tank;

supplying fluid to the first tank;

allowing fluid flow from the first tank through the first conduit to the cell;

allowing excess fluid to flow from through the second conduit and to the second tank;

charging the battery, the charging act including producing gas; and causing flow of fluid from the second tank, through the third conduit and to the first tank, the causing act including using gas produced during the charging act to cause fluid flow through the third conduit and to the first tank.

99. A vehicle comprising:

a frame supported for movement over ground;

an electric motor supported by the frame and operable to selectively drive said vehicle;

a fuel cell supported by the frame and operable to produce electricity to selectively power the motor, operation of the fuel cell producing water;

a battery supported by the frame and electrically connectable with the motor, the battery including a battery cell, water being transmittable to the cell;

a tank in fluid communication with the fuel cell and for holding water produced by the fuel cell during operation of the fuel cell; and a conduit connecting the battery to the tank, water being supplied from the tank through the conduit to replenish the battery cell.

100. The vehicle as set forth in claim 99 and further comprising a hydraulic circuit connecting the battery to the tank, the hydraulic circuit including an inlet conduit connectable between the tank and the battery cell, and an outlet conduit connectable between the battery cell and the tank, gas produced during charging causing flow of water through the outlet conduit and to the tank.

* * * * *